(12) United States Patent
Kraz et al.

(10) Patent No.: US 10,914,430 B2
(45) Date of Patent: Feb. 9, 2021

(54) SMART-HOME DEVICE LIGHT RINGS WITH LENS SPACING FOR UNIFORM OUTPUT

(71) Applicant: Google LLC, Mountain View, CA (US)

(72) Inventors: Mark Kraz, Santa Clara, CA (US); Amber Volmering, Newark, CA (US); Bryan Macomber, Los Altos Hills, CA (US); Jacobi Grillo, San Jose, CA (US); Adam Kilgore, Mountain View, CA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 15/940,427

(22) Filed: Mar. 29, 2018

(65) Prior Publication Data

US 2019/0208095 A1    Jul. 4, 2019

Related U.S. Application Data

(60) Provisional application No. 62/612,621, filed on Dec. 31, 2017.

(51) Int. Cl.
*F21V 8/00* (2006.01)
*H04N 5/225* (2006.01)
(Continued)

(52) U.S. Cl.
CPC .............. *F21K 9/61* (2016.08); *F21K 9/237* (2016.08); *F21K 9/62* (2016.08); *F21K 9/65* (2016.08);
(Continued)

(58) Field of Classification Search
CPC .... G02B 6/0021; G02B 6/005; G02B 6/0051; G02B 6/0068; F21K 9/61; F21K 9/62;
(Continued)

(56) References Cited

U.S. PATENT DOCUMENTS 5,857,761 A * 1/1999 Abe ................... G02B 6/001
362/268
6,053,621 A   4/2000 Yoneda
(Continued)

FOREIGN PATENT DOCUMENTS

DE    19904644 A1    8/2000
EP    2381302 A1    10/2011

OTHER PUBLICATIONS

International Search Report and Written Opinion dated Jun. 12, 2019 in International Patent Application No. PCT/US2018/067944, all pages.
(Continued)

*Primary Examiner* — Arman B Fallahkhair
(74) *Attorney, Agent, or Firm* — Kilpatrick Townsend & Stockton LLP

(57) ABSTRACT

A light ring assembly for a smart-home device may include a plurality of light-emitting diodes (LEDs) and a light guide, where the light guide may include a plurality of cutouts that receive the plurality of LEDs, and a plurality of transmissive sections between the plurality of cutouts. The light ring assembly may also include an output surface that receives light emitted from the plurality of LEDs through the plurality of transmissive sections, where the output surface is substantially circular. The light guide may also include a plurality of micro-lenses in the plurality of transmissive sections where a relative density of the micro-lenses increases as the transmissive sections extend away from the plurality of cutouts.

20 Claims, 25 Drawing Sheets

(51) Int. Cl.
*H04N 7/18* (2006.01)
*F21K 9/61* (2016.01)
*F21V 5/04* (2006.01)
*F21V 5/00* (2018.01)
*F21K 9/62* (2016.01)
*F21K 9/65* (2016.01)
*F21K 9/237* (2016.01)
*F21Y 115/10* (2016.01)

(52) U.S. Cl.
CPC ............. *F21V 5/004* (2013.01); *F21V 5/046* (2013.01); *G02B 6/005* (2013.01); *G02B 6/0021* (2013.01); *G02B 6/0051* (2013.01); *G02B 6/0068* (2013.01); *H04N 5/2256* (2013.01); *H04N 7/183* (2013.01); *F21Y 2115/10* (2016.08); *G02B 6/009* (2013.01); *G02B 6/0036* (2013.01); *G02B 6/0046* (2013.01)

(58) Field of Classification Search
CPC ......... F21K 9/65; F21K 9/237; H04N 5/2256; H04N 7/183
See application file for complete search history.

(56) References Cited

U.S. PATENT DOCUMENTS

| | | | | |
|---|---|---|---|---|
| 6,168,281 | B1 * | 1/2001 | Suzuki | G02B 6/0061 349/63 |
| 7,009,525 | B1 * | 3/2006 | Shafiyan-Rad | H01H 9/161 340/815.43 |
| 7,677,744 | B2 * | 3/2010 | Birman | B60K 37/02 362/23.11 |
| 7,688,400 | B1 * | 3/2010 | Schellhorn | G02B 6/00 349/65 |
| 7,845,808 | B2 * | 12/2010 | Lai | G02B 6/001 362/23.08 |
| 8,246,228 | B2 * | 8/2012 | Ko | G02B 6/0061 362/511 |
| 8,733,970 | B2 * | 5/2014 | Kim | G02B 6/0051 349/62 |
| 8,840,260 | B2 | 9/2014 | Nirei | |
| 9,772,439 | B2 * | 9/2017 | Montgomery | G02B 6/0021 |
| 10,317,609 | B2 * | 6/2019 | Lee | G02B 6/005 |
| 2006/0171137 | A1 * | 8/2006 | Tamaki | G01D 11/28 362/23.15 |
| 2015/0097666 | A1 * | 4/2015 | Boyd | F24F 11/30 340/517 |
| 2016/0334076 | A1 | 11/2016 | Dong et al. | |
| 2017/0329067 | A1 | 11/2017 | Li et al. | |
| 2018/0330169 | A1 | 11/2018 | Van Hoof et al. | |
| 2019/0203888 | A1 * | 7/2019 | Kraz | F21K 9/237 |

OTHER PUBLICATIONS

Invitation to Pay Additional Fees and, Where Applicable, Protest Fee dated Apr. 15, 2019 in International Patent Application No. PCT/US2018/067944, all pages.
Non-Final Office Action dated Sep. 6, 2019 in U.S. Appl. No. 15/940,476, all pages.
Advisory Action dated Jun. 17, 2020 in U.S. Appl. No. 15/940,476, 7 pages.
International Preliminary Report on Patentability dated Jun. 30, 2020 in International Patent Application No. PCT/US2018/067944, 9 pages.

\* cited by examiner

SMART-HOME DEVICE LIGHT RINGS WITH LENS SPACING FOR UNIFORM OUTPUT

CROSS-REFERENCES TO RELATED APPLICATIONS

This application claims the benefit of U.S. Provisional Patent Application No. 62/612,621, filed on Dec. 31, 2017, titled UNIFORM LIGHT RINGS FOR SMART-HOME DEVICES, which is incorporated herein by reference.

TECHNICAL FIELD

This patent specification relates generally to uniform light rings illuminated by a discrete number of light sources. More particularly, this patent specification describes light rings illuminated by Light-Emitting Diodes (LEDs) for smart-home devices, such as video camera assemblies, keypads, security system sensors, thermostats, hazard detectors, doorbells, and/or the like.

BACKGROUND

Smart-home devices are rapidly becoming part of the modern home experience. These devices may include thermostats, keypads, touch screens, and/or other control devices for controlling environmental systems, such as HVAC systems or lighting systems. The smart-home environment may also include smart appliances, such as washing machines, dishwashers, refrigerators, garbage cans, and so forth, that interface with control and/or monitoring devices to increase the level of functionality and control provided to an occupant. Security systems, including cameras, keypads, sensors, motion detectors, glass-break sensors, microphones, and so forth, may also be installed as part of the smart-home architecture. Other smart-the home devices may include doorbells, monitoring systems, hazard detectors, smart lightbulbs, and virtually any other electronic device that can be controlled via a wired/wireless network.

Many of these smart home devices may benefit from an illumination source that is integrated with the smart-home device or incident upon an area surrounding the smart-home device. For example, usage of video cameras in residential and commercial environments has increased substantially, in part due to lower prices and simplicity of deployment as part of monitoring and/or security systems. To provide high-quality video feeds even in low-light environments, a camera recording a scene may generally benefit from having the scene be illuminated by a light source. In another example, smart-home devices, such as a keypad, that allow for user interaction may also benefit from illumination when used at night or in a dark environment. In yet another example, smart home devices may also provide a low level of illumination for security, emergency, and/or night time lights. As smart home devices proliferate throughout a home, these devices can detect an occupant's presence and automatically illuminate the surrounding area in the dark so that the user can safely travel through the environment.

BRIEF SUMMARY

A further understanding of the nature and advantages of the present invention may be realized by reference to the remaining portions of the specification and the drawings. Also note that other embodiments may be described in the following disclosure and claims.

In some embodiments, a light ring assembly for a smart-home device may include a plurality of light-emitting diodes (LEDs) and a light guide. The light guide may include a plurality of cutouts that receive the plurality of LEDs and a plurality of transmissive sections between the plurality of cutouts. The light ring assembly may also include a plurality of micro-lenses in the plurality of transmissive sections. A relative density of the micro-lenses may increase as the transmissive sections extend away from the plurality of cutouts. The light ring assembly may additionally include an output surface that receives light emitted from the plurality of LEDs through the plurality of transmissive sections. The output surface may be substantially circular.

In some embodiments, a method of generating a uniform light ring in a smart-home device may include generating light from a plurality of light-emitting diodes (LEDs) and receiving the light from the plurality of LEDs at a light guide. The light guide may include a plurality of cutouts that receive the plurality of LEDs and a plurality of transmissive sections between the plurality of cutouts. The method may also include channeling light down the plurality of transmissive sections. A relative density of the micro-lenses may increase as the transmissive sections extend away from the plurality of cutouts. The method may additionally include emitting light from an output surface of the light guide. The output surface may be substantially circular.

In any embodiments, one or more of the following features may be included in any combination and without limitation. A light output of the output surface may be substantially uniform. The plurality of LEDs may include only two LEDs. The light ring assembly may also include a light mask that is coupled to the light guide. The light mask may include a Mylar tape that is adhered to the exterior surface of the light guide. The light mask may be coupled to a portion of the light guide that is at least in part directly above one of the plurality of cutouts. A width of the light mask may taper as the light mask extends away from one of the plurality of cutouts. The smart-home device may include a first reflective surface, where light emitted from the output surface of the light ring assembly may be reflected off of the first reflective surface before exiting the smart-home device. The smart-home device may include a second reflective surface, where light reflected off of the first reflective surface may be reflected off of the second reflective surface before exiting the smart-home device. The plurality of cutouts may be evenly distributed in a circular pattern around the light guide. The plurality of LEDs may be side-firing LEDs. The plurality of transmissive sections may run between each of the plurality of cutouts in a substantially circular shape. The plurality of LEDs may be top-firing LEDs. The plurality of transmissive sections may run parallel to the light emitted from the top-firing LEDs. The plurality of transmissive sections may have a scalloped shape. The smart-home device may include a diffusive ring through which light from the output surface may be diffused before leaving the smart-home device. The smart-home device may include a video camera. The smart-home device may include a motion sensor of a security system. A thickness of the transmissive sections may taper as the transmissive sections extend away from the plurality of cutouts.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure. It will be apparent to one skilled in the art that the present invention may be practiced without some or all of these specific details. In other instances, well known details have not been described in detail in order not to unnecessarily obscure the present invention.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
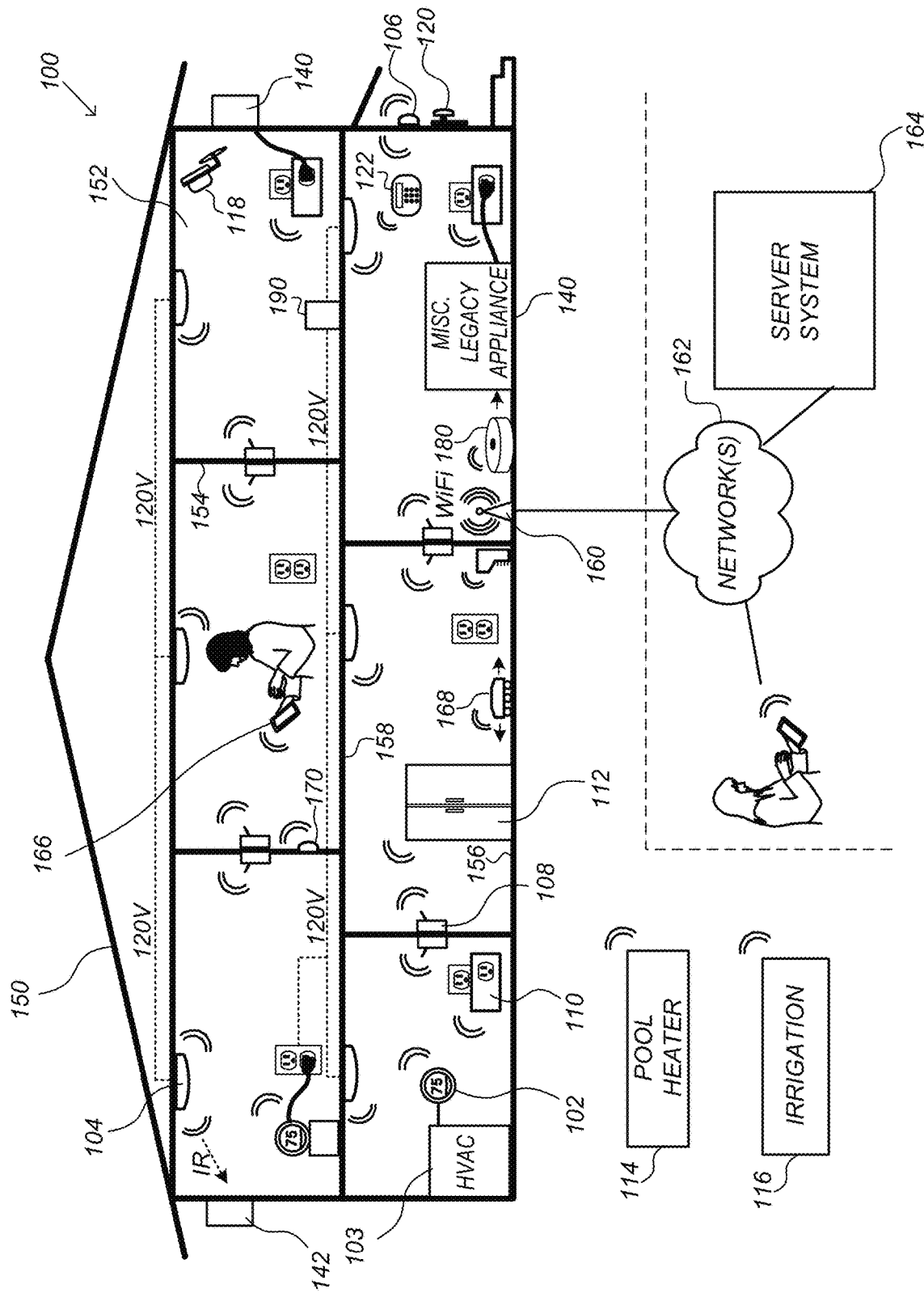
FIG. 1 is an example of a smart-home environment within which one or more of the devices, methods, systems, services, and/or computer program products described further herein will be applicable, according to some embodiments.

FIG. 1 illustrates an example smart-home environment 100, according to some embodiments. The smart-home environment 100 includes a structure 150 (e.g., a house, office building, garage, or mobile home) with various integrated devices. It will be appreciated that devices may also be integrated into a smart-home environment 100 that does not include an entire structure 150, such as an apartment, condominium, or office space. Further, the smart-home environment 100 may control and/or be coupled to devices outside of the actual structure 150. Indeed, several devices in the smart-home environment 100 need not be physically within the structure 150. For example, a device controlling a pool heater 114 or irrigation system 116 may be located outside of the structure 150.

The term "smart-home environment" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space. Similarly, while the terms user, customer, installer, homeowner, occupant, guest, tenant, landlord, repair person, etc., may be used to refer to a person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, as well as being one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the implementations, such an identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156, or ceiling 158.

In some implementations, the integrated devices of the smart-home environment 100 include intelligent, multi-sensing, network-connected devices that integrate seamlessly with each other in a smart-home network and/or with a central server or a cloud-computing system to provide a variety of useful smart-home functions. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122"). Although not depicted explicitly in FIG. 1, the smart-home environment 100 may also include other monitoring systems, such as baby monitoring systems, elderly monitoring systems, handicapped monitoring systems, and so forth.

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 may include a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual devices, and/or control settings on a security system (e.g., to activate or deactivate the security system when occupants go and come). In some implementations, the smart doorbell 106 may include some or all of the components and features of the camera 118. In some implementations, the smart doorbell 106 includes a camera 118.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart-home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker) for providing notifications. In some implementations, the smart alarm system 122 may also be set to an "armed" mode, such that detection of a trigger condition or event causes the alarm to be sounded unless a disarming action is performed.

In some implementations, the smart-home environment 100 may include one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart-home environment 100 of FIG. 1 may include a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as older-model conventional washers/dryers, refrigerators, and/or the like, which may be controlled by smart wall plugs 110. The smart-home environment 100 may further include a variety of partially communicating legacy appliances 142, such as infrared ("IR") controlled wall air conditioners or other IR-controlled devices, which may be controlled by IR signals provided by the smart hazard detectors 104, hand-held remote controls, key FOBs, or the smart wall switches 108.

In some implementations, the smart-home environment 100 may include one or more network-connected cameras 118 that are configured to provide video monitoring and security in the smart-home environment 100. The cameras 118 may be used to determine the occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 may each be configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

The smart-home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart-home environment 100 may include radio-frequency identification (RFID) readers (e.g., in each room 152 or a portion thereof) that determine occupancy based on RFID tags located on or embedded in occupants. For example, RFID readers may be integrated into the smart hazard detectors 104, and RFID tags may be worn in users clothing for integrated in hand-held devices such as a smart phone.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 and/or receives commands for controlling the pool temperature. Similarly, the smart-home environment 100 may include an irrigation monitor 116 that communicates information regarding irrigation systems within the smart-home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart-home environment 100 using a network-connected computer or portable electronic device 166. In some examples, some or all of the occupants (e.g., individuals who live in the home) may register their device 166 with the smart-home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 may make inferences about (1) which individuals live in the home and are therefore occupants, and (2) which devices 166 are associated with those individuals. As such, the smart-home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices" or "the smart-home devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices may serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart-home environment 100 of FIG. 1 includes a hub device 180 that is communicatively coupled to the network(s) 162 directly or via the network interface 160. The hub device 180 may be further communicatively coupled to one or more of the above intelligent, multi-sensing, network-connected devices (e.g., smart devices of the smart-home environment 100). Each of these smart devices optionally communicates with the hub device 180 using one or more radio communication networks available at least in the smart-home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends the capabilities of low-capability smart devices to match the capabilities of the highly capable smart devices of the same type, integrates functionality of multiple different device types— even across different communication protocols, and is configured to streamline adding of new devices and commissioning of the hub device. In some implementations, hub device 180 further comprises a local storage device for storing data related to, or output by, smart devices of smart-home environment 100. In some implementations, the data includes one or more of: video data output by a camera device, metadata output by a smart device, settings information for a smart device, usage logs for a smart device, and the like.

In some implementations, smart-home environment 100 includes a local storage device 190 for storing data related to, or output by, smart devices of smart-home environment 100. In some implementations, the data includes one or more of: video data output by a camera device (e.g., camera 118), metadata output by a smart device, settings information for a smart device, usage logs for a smart device, and the like. In some implementations, local storage device 190 is communicatively coupled to one or more smart devices via a smart home network. In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of camera 118 exceeds the available bandwidth of the external network (e.g., network(s) 162). In some implementations, local storage device 190 temporarily stores video data from one or more cameras (e.g., camera 118) prior to transferring the video data to a server system (e.g., server system 164).

In some implementations, the smart-home environment 100 includes service robots 168 that are configured to carry out, in an autonomous manner, any of a variety of household tasks.

Figure 2A:
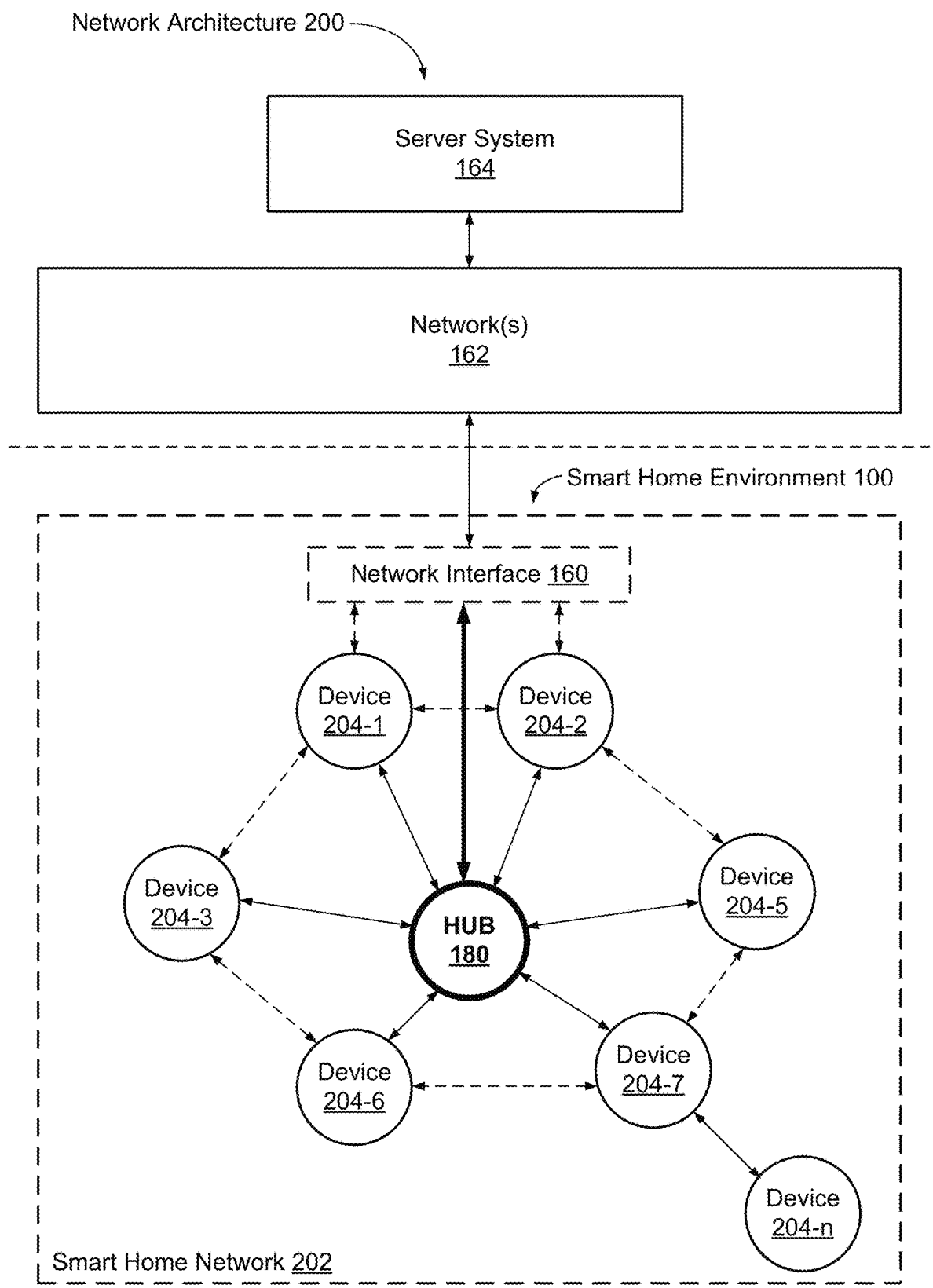
FIG. 2A illustrates a simplified block diagram of a representative network architecture that includes a smart-home network in accordance, according to some embodiments.

FIG. 2A illustrates a simplified block diagram of a representative network architecture 200 that includes a smart home network 202 in accordance with some implementations. In some implementations, the smart devices 204 in the smart-home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or server system 164) and sends commands (e.g., to smart devices 204 in the smart home network 202) to control operation of the smart-home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are typically equipped with the capability of using a wireless protocol to facilitate bidirectional communication with a variety of other devices in the smart-home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes may be incapable of bidirectional communication. These low-power nodes may send messages, but they are unable to "listen." Thus, other devices in the smart-home environment 100, such as the spokesman nodes, need not send information to these low-power nodes. In some implementations, some low-power nodes are capable of only a limited bidirectional communication. For example, other devices are able to communicate with the low-power nodes only during a certain time period.

In some implementations, the smart devices may serve as low-power and spokesman nodes to create a mesh network in the smart-home environment 100. In some implementations, individual low-power nodes in the smart-home environment may regularly send out messages regarding what they are sensing, and the other low-powered nodes in the smart-home environment—in addition to sending out their own messages—may forward these messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 202, as well as over the Internet 162 to the server system 164. In some implementations, the mesh network enables the server system 164 to regularly receive data from most or all of the smart devices in the home, make inferences based on the data, facilitate state synchronization across devices within and outside of the smart home network 202, and send commands to one or more of the smart devices to perform tasks in the smart-home environment.

The spokesman nodes and some of the low-powered nodes are capable of "listening." Accordingly, users, other devices, and/or the server system 164 may communicate control commands to the low-powered nodes. For example, a user may use the electronic device 166 (e.g., a smart phone) to send commands over the Internet to the server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the server system 164.

In some implementations, a smart nightlight 170, which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As described above, these messages may be sent wirelessly (e.g., using the mesh network) from node to node (i.e., smart device to smart device) within the smart home network 202 as well as over the Internet 162 to the server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

As explained above with reference to FIG. 1, in some implementations, the smart-home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart-home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network (WAN). All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2B:
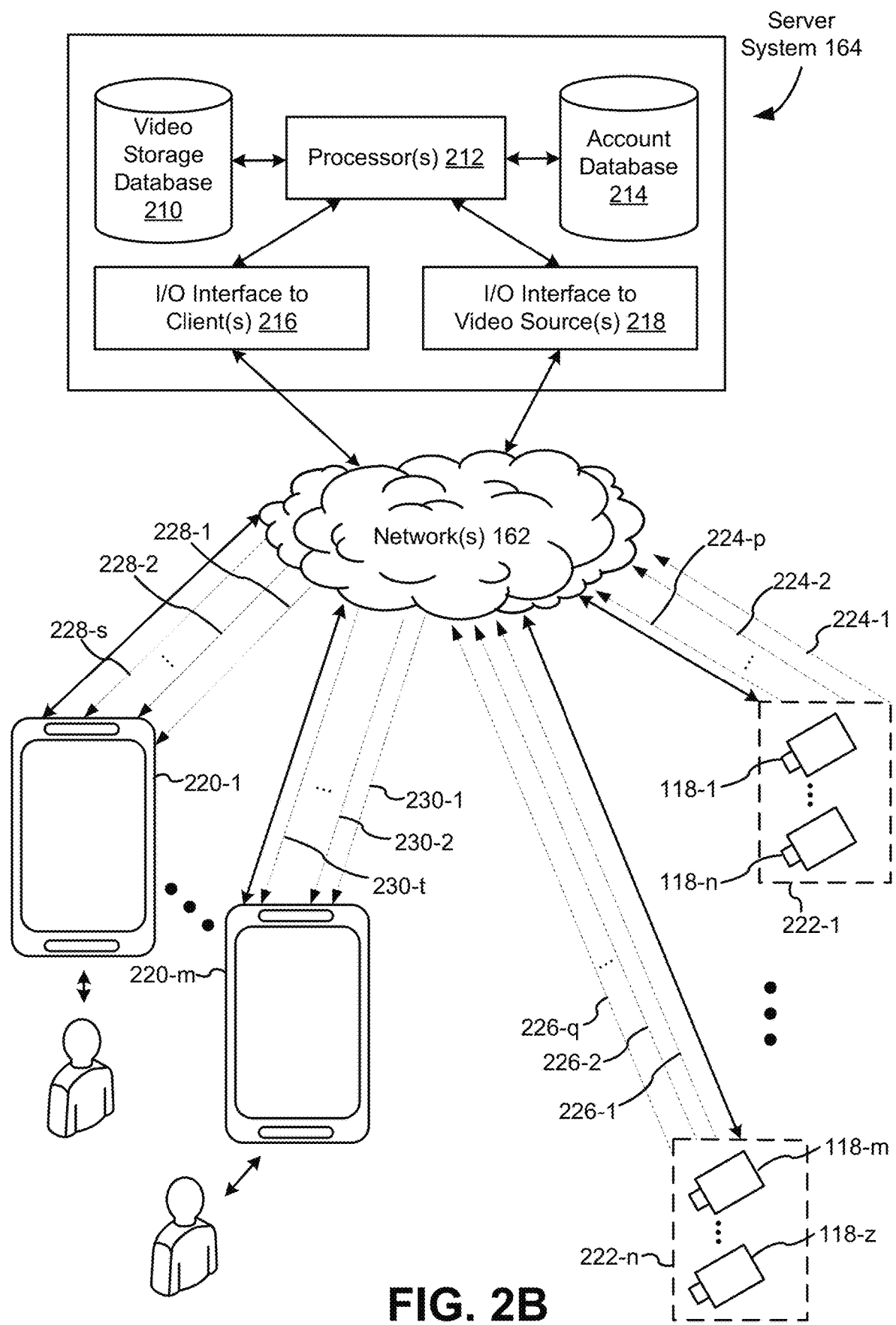
FIG. 2B illustrates a simplified operating environment in which a server system interacts with client devices and smart devices, according to some embodiments.

FIG. 2B illustrates a representative operating environment in which a server system 164 provides data processing for monitoring and facilitating review of events (e.g., motion, audio, security, etc.) in video streams captured by video cameras 118. As shown in FIG. 2B, the server system 164 receives video data from video sources 222 (including cameras 118) located at various physical locations (e.g., inside homes, restaurants, stores, streets, parking lots, and/or the smart-home environments 100 of FIG. 1). Each video source 222 may be bound to one or more reviewer accounts, and the server system 164 provides video monitoring data for the video source 222 to client devices 220 associated with the reviewer accounts. For example, the portable electronic device 166 is an example of the client device 220. In some implementations, the server system 164 is a video processing server that provides video processing services to video sources and client devices 220.

In some implementations, each of the video sources 222 includes one or more video cameras 118 that capture video and send the captured video to the server system 164 substantially in real-time. In some implementations, each of the video sources 222 includes a controller device (not shown) that serves as an intermediary between the one or more cameras 118 and the server system 164. The controller device receives the video data from the one or more cameras 118, optionally performs some preliminary processing on the video data, and sends the video data to the server system 164 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 164.

In accordance with some implementations, each of the client devices 220 includes a client-side module. The client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. The server-side module also provides server-side functionality for video processing and camera control for any number of the video sources 222, including any number of control devices and the cameras 118.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more cameras 118 and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an eBook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 may be implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 2B includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 222 cooperatively.

In some implementations, a video source 222 (e.g., a camera 118) transmits one or more streams of video data to the server system 164. In some implementations, the one or more streams may include multiple streams, of respective resolutions and/or frame rates, of the raw video captured by the camera 118. In some implementations, the multiple streams may include a "primary" stream with a certain resolution and frame rate, corresponding to the raw video captured by the camera 118, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams are sent from the video source 222 directly to a client device 220 (e.g., without being routed to, or processed by, the server system 164). In some implementations, one or more of the streams is stored at the camera 118 (e.g., in memory 406, FIG. 4) and/or a local storage device (e.g., a dedicated recording device), such as a digital video recorder (DVR). For example, in accordance with some implementations, the camera 118 stores the most recent 24 hours of video footage recorded by the camera. In some implementations, portions of the one or more streams are stored at the camera 118 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams may include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream, as described in greater detail in U.S. patent application Ser. No. 15/594,518, which is incorporated herein by reference.

Figure 3:
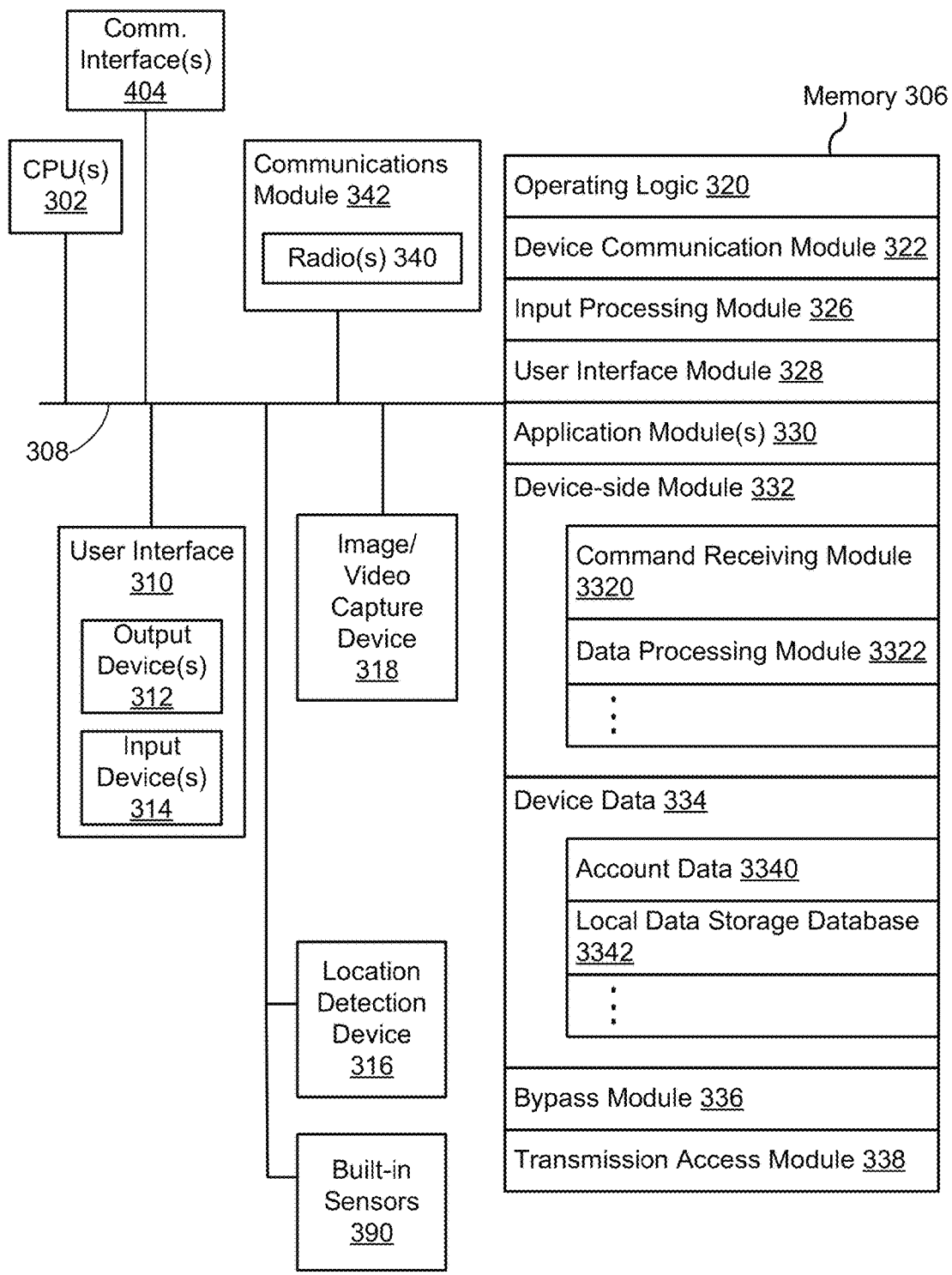
FIG. 3 is a block diagram illustrating a representative smart device in accordance with some implementations.

FIG. 3 is a block diagram illustrating a representative smart device 204 in accordance with some implementations. In some implementations, the smart device 204 (e.g., any devices of a smart-home environment 100, FIG. 1) includes one or more processing units (e.g., CPUs, ASICs, FPGAs, microprocessors, and the like) 302, one or more communication interfaces 304, memory 306, communications module 342 with radios 340, and one or more communication buses 308 for interconnecting these components (sometimes called a chipset). In some implementations, the user interface 310 includes one or more output devices 312 that enable presentation of media content, including one or more speakers and/or one or more visual displays. In some implementations, the user interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 318 (e.g., cameras, video cameras, scanners, photo sensor units). The built-in sensors 390 may include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 340 enable one or more radio communication networks in the smart-home environments, and allow a smart device 204 to communicate with other devices. In some implementations, the radios 340 are capable of data communications using any of a variety of custom or standard wireless protocols (e.g., IEEE 802.15.4, Wi-Fi, ZigBee, 6LoWPAN, Thread, Z-Wave, Bluetooth Smart, ISA 100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 304 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA 100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, or alternatively the non-volatile memory within the memory 306, includes a non-transitory computer readable storage medium. In some implementations, the memory 306, or the non-transitory computer readable storage medium of the memory 306, stores the following programs, modules, and data structures, or a subset or superset thereof: operating logic 320 including procedures for handling various basic system services and for performing hardware dependent tasks; a device communication module 322 for connecting to and communicating with other network devices (e.g., network interface 160, such as a router that provides Internet connectivity, networked storage devices, network routing devices, server system 164, etc.) connected to one or more networks 162 via one or more communication interfaces 304 (wired or wireless); an input processing module 326 for detecting one or more user inputs or interactions from the one or more input devices 314 and interpreting the detected inputs or interactions; a user interface module 328 for providing and displaying a user interface in which settings, captured data, and/or other data for one or more devices (e.g., the smart device 204, and/or other devices in smart-home environment 100) can be configured and/or viewed; one or more applications 330 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices); a device-side module 332, which provides device-side functionalities for device control, data processing and data review, including but not limited to: a command receiving module 3320 for receiving, forwarding, and/or executing instructions and control commands (e.g., from a client device 220, from a server system 164, from user inputs detected on the user interface 310, etc.) for operating the smart device 204; a data processing module 3322 for processing data captured or received by one or more inputs (e.g., input devices 314, image/video capture devices 318, location detection device 316), sensors (e.g., built-in sensors 390), interfaces (e.g., communication interfaces 304, radios 340), and/or other components of the smart device 204, and for preparing and sending processed data to a device for review (e.g., client devices 220 for review by a user); device data 334 storing data associated with devices (e.g., the smart device 204), including, but is not limited to: account data 3340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; local data storage database 3342 for selectively storing raw or processed data associated with the smart device 204 (e.g., video surveillance footage captured by a camera 118); a bypass module 336 for detecting whether radio(s) 340 are transmitting signals via respective antennas coupled to the radio(s) 340 and to accordingly couple radio(s) 340 to their respective antennas either via a bypass line or an amplifier (e.g., a low noise amplifier); and a transmission access module 338 for granting or denying transmission access to one or more radio(s) 340 (e.g., based on detected control signals and transmission requests).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

The smart device 204 depicted in FIG. 3 can take many different forms depending on the particular embodiment. For example, in some smart-home environments, the smart device 204 can include a keypad or security system. In other embodiments, the smart device 204 may include an infrared motion detector and/or wireless magnetic switch. In some embodiments, the smart device 204 may include motion cameras that are compatible with indoor and/or outdoor environments. Various other smart-home device embodiments may also be realized as implementations for the smart device 204 depicted above. Each of these various embodiments may operate in low-light or no-light environments. For example, a keypad for a security system may be operated in the night when a user may be unable to turn on the lights. When initially entering their residence, the user may wish to turn off the security system before turning on the lights. In an intrusion scenario, the user may wish to activate the security system without turning on the lights to avoid alerting the intruder to their presence. In each of these scenarios, the smart device 204 may provide its own integrated lighting for user convenience.

In many smart devices, the ideal shape for a light source may be a substantially circular output surface. For example, the keypad may include a substantially circular light ring around the numerical buttons. This can serve to encircle the user interface with light such that the user can see to enter security codes, activation codes, etc. In another example, security cameras may benefit from providing a light ring around the camera lens. This can serve to light the viewing area of the camera when recording or in response to a user presence. For any smart device 204, light rings may be provided to generate emergency lighting in low-light scenarios. For example, a hazard detector, motion detector, and/or magnetic switch may provide emergency or night lighting when installed in a user's home, and may activate automatically when a user presence is detected.

Providing light rings for smart devices in any smart-home environment is not a trivial operation. Smart devices include numerous design challenges that complicate generating uniform light rings from discrete light sources. First, it is usually advantageous to use light-emitting diodes (LEDs) as opposed to other lighting techniques, such as incandescent bulbs, halogen bulbs, florescent bulbs, and/or the like. LEDs are lower cost, smaller in size, and typically use far less power than these other lighting options. While the output of LEDs can be brighter and more intense than other light sources, this can also cause difficulties in transforming the discrete LED sources into a uniform ring of light. Because LEDs can have such a high luminous intensity, spreading that intensity uniformly through a substantially circular output surface can be difficult. For example, areas of the output surface that are closer to the LEDs may generally be brighter than other areas, causing a non-uniform light output on the substantially circular output surface.

Another challenge is limiting the number of LEDs that may be present in a smart device. Even given the relatively low cost, many designs may still need to minimize the number of LEDs present to preserve power and/or due to space constraints. Many smart devices are battery operated, or at least operate on a low-power budget. Therefore, it may be advantageous to generate a uniform light ring using only a minimal number of LEDs. Smart devices are also often very space-constrained in their physical design. This can lead to very tight constraints when arranging the placement of LEDs, light guides, lenses, reflective surfaces, masks, and/or outputs.

Figure 4:
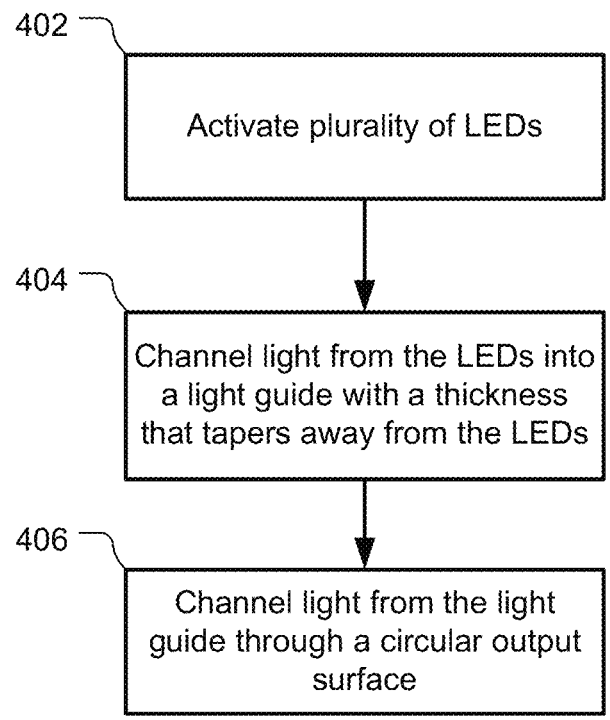
FIG. 4 illustrates a flowchart of a method of generating a uniform light ring in a smart device, according to some embodiments.

In order to generate low-cost light rings for smart devices in the smart-home environment, this disclosure describes a number of different techniques that may be used when placing LEDs, designing light guides, and arranging substantially circular output surfaces. FIG. 4 illustrates a flowchart 400 of a method of generating a uniform light ring in a smart device, according to some embodiments. The method may include activating a plurality of LEDs (402). The method may also include channeling light from the LEDs into a light guide with a thickness that tapers as light guide sections extend away from the LEDs (404). In some embodiments, the light guide may include a plurality of cutouts that receive the LEDs when the LEDs are mounted to a separate circuit board. The method may also include channeling light from the light guide through a circular output surface (406). The circular output surface can be directly visible to a user as a light ring, or may be reflected off additional services to otherwise diffuse or redirect the light ring output.

Figure 5:
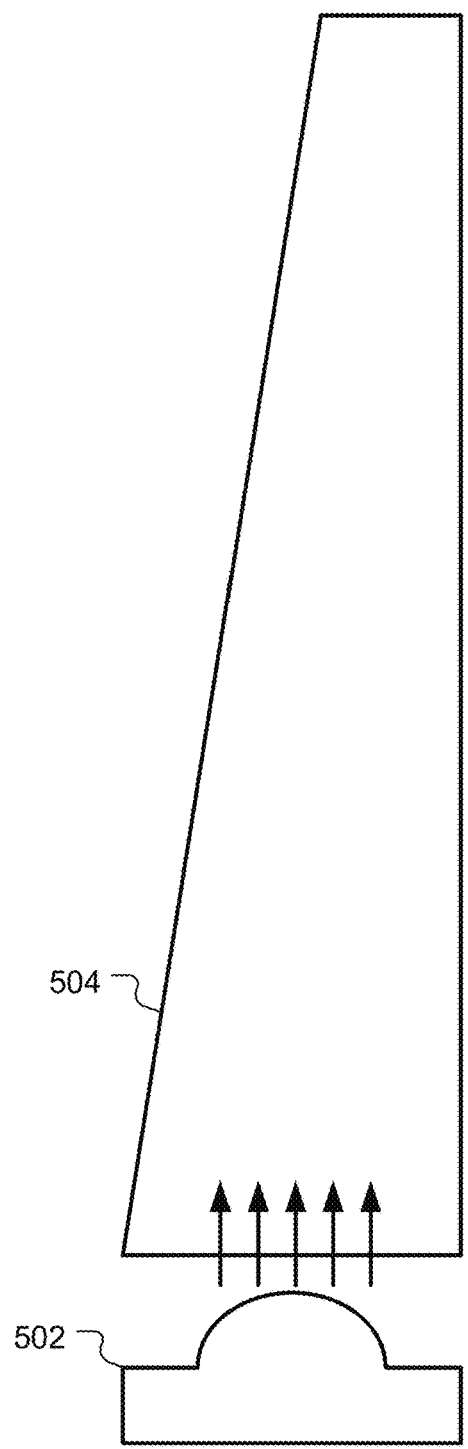
FIG. 5 illustrates a simplified block diagram of how a tapered light guide can be used to generate a uniform light ring from discrete LEDs.

FIG. 5 illustrates a simplified block diagram of how a tapered light guide can be used to generate a uniform light ring from discrete LEDs. For simplicity, this diagram only shows a single LED 502 and a single transmissive section 504 of the light guide. It will be understood, and will be made readily apparent with the further examples described below, that additional transmissive sections, LEDs, cutouts, masks, and/or the like may be combined to form an entire light ring assembly for a smart device. In this simplified example, the LED 502 will direct light into the transmissive section 504 of the light guide. The transmissive section 504 may be sized large enough to capture most if not all of the light emitted by the LED 502 in a portion of the transmissive section 504 that is closest to the LED 502. As the transmissive section 504 extends away from the LED 502, a thickness of the transmissive section 504 can decrease or taper as the transmissive section 504 extends away from the LED 502.

Depending on the embodiment, the light that is channeled through the transmissive section 504 of the light guide may be channeled through a substantially circular output in different ways. In some embodiments, the light channeled through the transmissive section 504 may be reflected upwards perpendicular to the direction of the transmissive section 504. In other embodiments, the light channeled through the transmissive section 504 may be emitted through the smaller end of the transmissive section 504. These configurations may be determined based on whether the LED 502 is a side-firing LED or a top-firing LED. Further examples of these different configurations will be described in detail below. The physical mechanisms for evenly distributing light as it is emitted from the substantially circular output surface will also be described in relation to the embodiments below.

Figure 6:
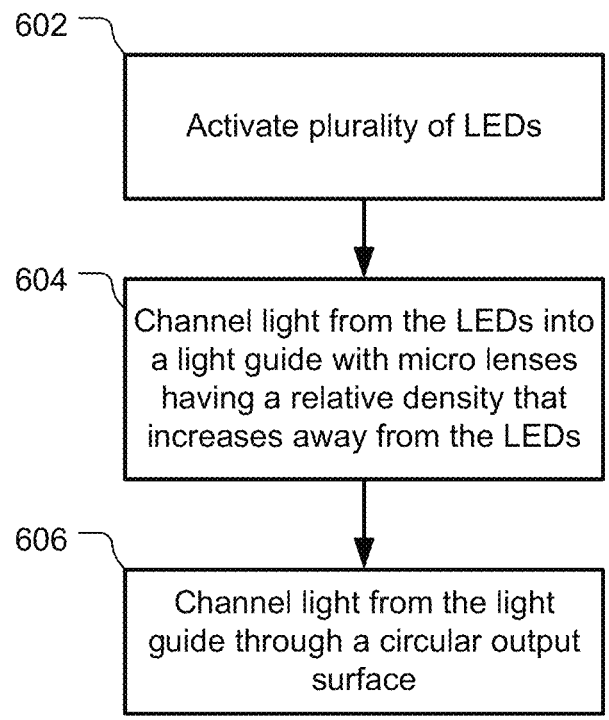
FIG. 6 illustrates a flowchart of a method for generating a uniform light ring.

In addition to tapering a transmissive section of the light guide as it extends away from the LEDs, some embodiments may alternatively and/or additionally use at least a second technique for generating a uniform light ring from a discrete number of LEDs. FIG. 6 illustrates a flowchart 600 of a method for generating a uniform light ring. The method may include activating a plurality of LEDs (602). As described above, the light from those LEDs can be channeled into a light guide. Instead of, or in addition to, tapering the light guide, the method may also include providing a plurality of micro-lenses in the light guide having a relative density that increases as the section of the light guide extends away from each LED (604). As the light is channeled through the transmissive portion of the light guide, the micro-lenses may cause the light to exit through the substantially circular output surface to provide a uniform light ring (606).

Figure 7:
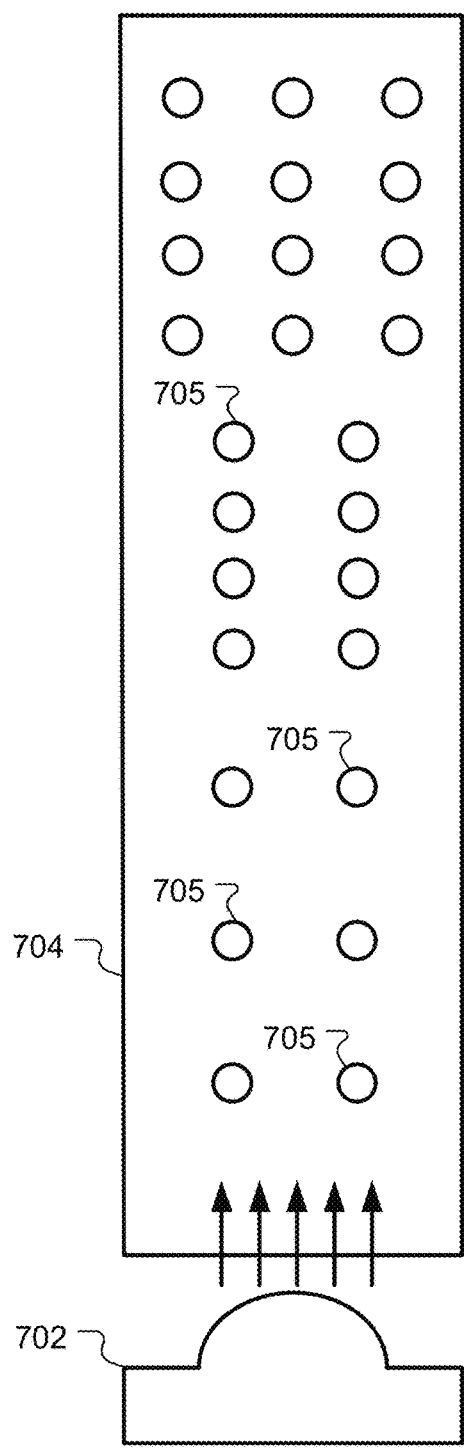
FIG. 7 illustrates a simplified diagram of a transmissive section of a light guide with a plurality of micro-lenses, according to some embodiments.

FIG. 7 illustrates a simplified diagram of a transmissive section 704 of a light guide with a plurality of micro-lenses 705, according to some embodiments. Like the example of FIG. 5, the transmissive section 704 can be wide enough near the LED 702 such that most of the light from the LED 702 is captured by the transmissive section 704. As the light moves through the transmissive section 704, the light can be reflected perpendicularly such that the light exits through the top of the transmissive section 704. As transmissive sections such as transmissive section 704 are linked or formed together in a circular fashion, the light can be reflected perpendicularly to form a uniform light ring using the micro-lenses 705. In some embodiments, the micro-lenses may be polished, half-spherical cavities that are removed from the bottom of the transmissive section 704. As the light moves through the transmissive section 704 and encounters the round indentations, the light may reflect upwards away from the micro-lenses.

In order to reflect a uniform amount of light as it travels through the transmissive section 704, the relative density of the micro-lenses 705 can increase. This allows the light to continue traveling through the transmissive section 704 when it is close to the LED 702 such that each section of the transmissive section 704 will have enough remaining light to be scattered upwards by the micro-lenses 705. Additionally, because the intensity of the light near the LED 702 will be greater, fewer micro-lenses 705 may be required to equal the luminous intensity of the reflected light farther away from the LED 702. Stated another way, the increasing number of micro-lenses 705 away from the LED 702 can compensate for the brightness that will be inherent closer to the LED 702. Additionally, fewer micro-lenses 705 near the LED 702 may ensure that enough light reaches the other end of the transmissive section 704 before being scattered near the LED 702.

The relative density of the micro-lenses 705 can be increased by adding more micro-lenses 705. Alternatively or additionally, the relative density of the micro-lenses 705 can also be increased by changing the thickness of the transmissive section 704. For example, some embodiments may use a uniform pattern of micro-lenses 705 while tapering a thickness of the transmissive section 704 as it extends away from the LED 702 as illustrated in FIG. 5.

To show how these different techniques for generating uniform outputs for substantially circular light rings can be combined and implemented in different embodiments, four specific implementations will now be described. Some implementations will use a tapering of the thickness of transmissive sections between each LED, while other implementations will use changes in the relative density of the micro-lenses. Some implications will use a combination of both techniques, along with other techniques such as masking and/or reflecting light internally within the device. It should be recognized that these examples and combinations of techniques shown by way of example and are not meant to be limiting. Any of the techniques described herein may be used in any combination and without limitation in any implementation.

Figure 8:
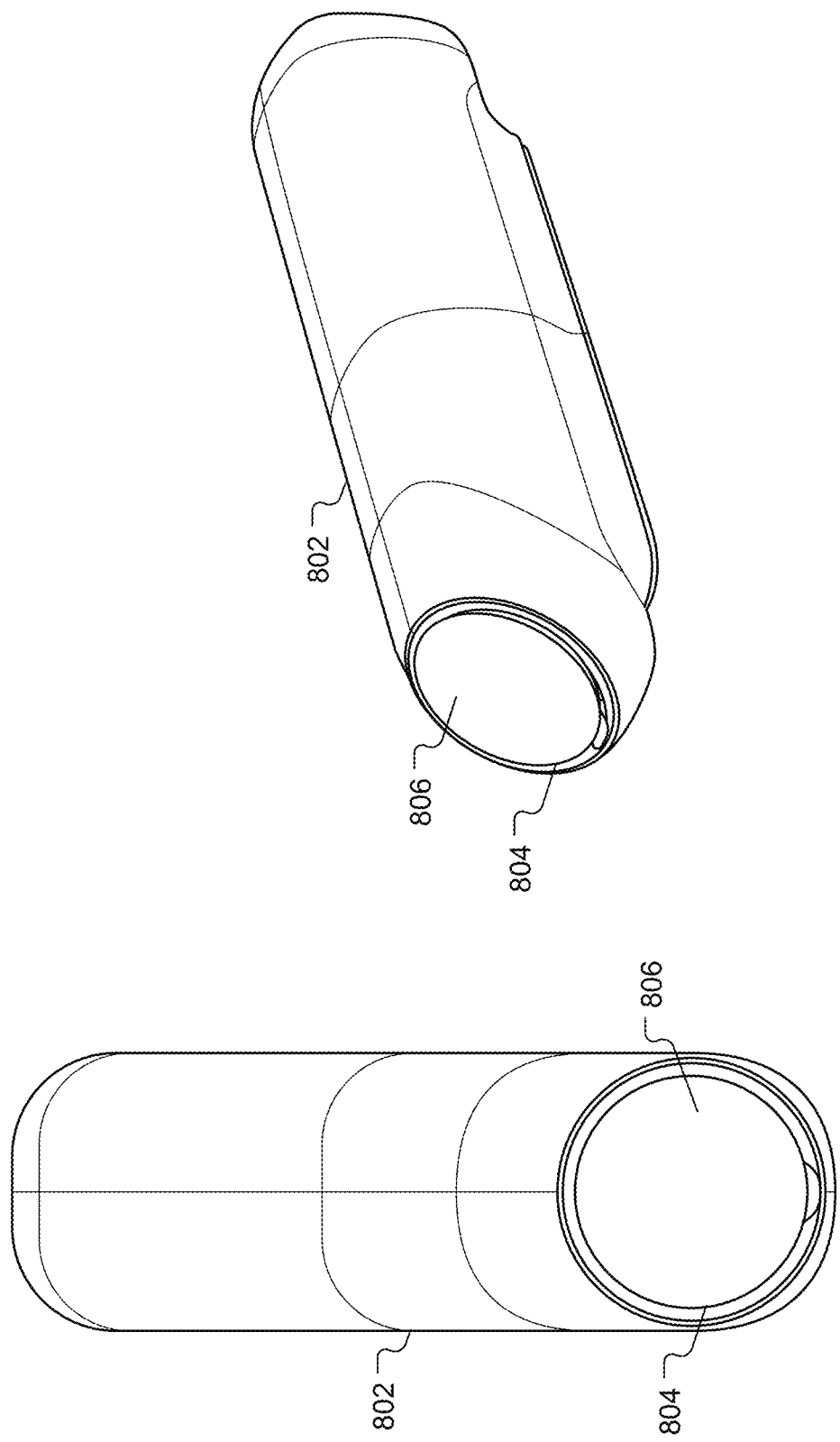
FIG. 8 illustrates a smart device that may be used as a motion detector and/or magnetic contact switch for a home security system, according to some embodiments.

FIG. 8 illustrates a smart device that may be used as a motion detector and/or magnetic contact switch for a home security system, according to some embodiments. The device 802 may be relatively small in size (e.g., less than 4 inches long with a diameter of less than 1 inch). The device 802 can be secured to a wall next to a door or window. The door or window may include a second small magnetic device that is sensed by the device 802 when the door/window is closed. Additionally, the device may include a domed cover 806 that serves as both a press button and a window/lens for a passive infrared (PIR) sensor. A user can press the cover 806 to experience a tactile "click" that can be used as an input to program, activate, or otherwise interact with the device 802. The cover 806 may appear translucent, but may still allow infrared energy to permeate the cover 806 such that a PIR sensor inside the device 802 can be used to detect user presence and/or motion.

When mounted on the wall or door/window frame, the device 802 can be mounted vertically as shown on the left in FIG. 8. The cover 806 can be oriented in approximately a 45° angle looking down and out into the room. Beneath the cover 806, the device 802 may include a light ring 804. The light ring 804 can be generated by a discrete number of LEDs. In this embodiment, the light ring 804 can include a number of reflections after the light is emitted from a substantially circular output surface such that the light is diffused when visible outside of the device 802 to a user. The light ring 804 can be activated by pressing the cover 806. The light ring 804 can also be automatically activated at night when a user presence is detected. For example, placing a plurality of the devices 802 in a residence on various doors, windows, and walls can provide emergency or nighttime lighting as a user walks through the residence in the dark.

There are a number of challenges when designing a uniform light ring 804 in a device as small as device 802. For example, because device 802 is battery-power, a minimal number of LEDs should be used. Additionally, the luminous intensity of the LEDs may be large compared to the size of the device 802. Therefore, certain design features described below are implemented to prevent light from leaking throughout the internal cavity of the device 802 and causing a "glowing" effect throughout the device rather than a singular output at the light ring 804. Additionally, the light ring 804 is built into the same assembly as the cover 806. Thus, when pressing the cover 806 to activate the button functionality, the entire light ring assembly 804 moves. Finally, the light ring assembly and function should not be allowed to interfere with the PIR sensor as it detects human presence and motion.

Figure 9:
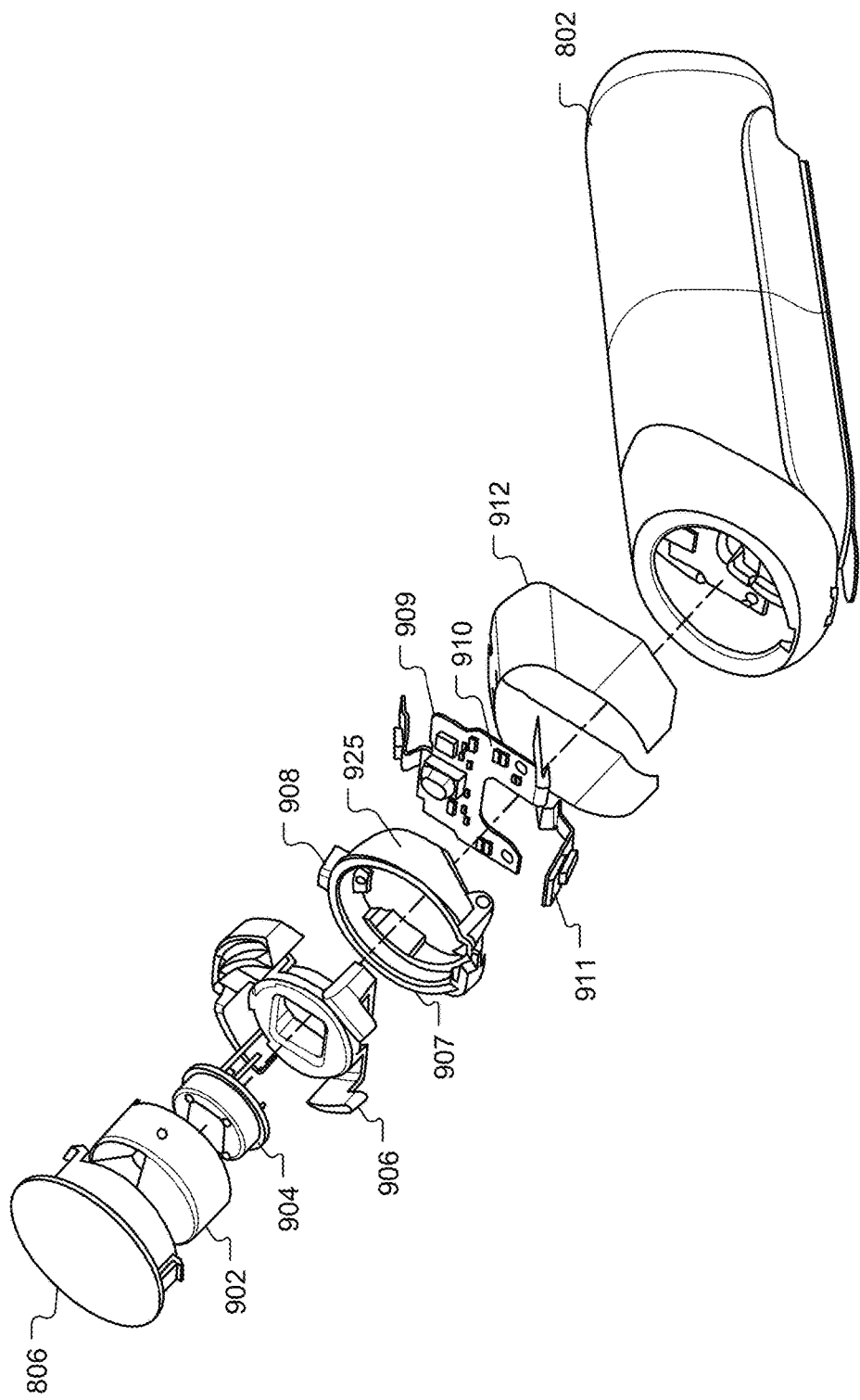
FIG. 9 illustrates an exploded view of the smart device for a home security system, according to some embodiments.

FIG. 9 illustrates an exploded view of the smart device 802 for a home security system, according to some embodiments. The device 802 may include a light mask 912 that prevents light from leaking out of the device 802. Without the light mask 912, the case of the device 802 may be thin enough that it would produce a "glow" effect because the LEDs 910 are located close to the edge of the device on the circuit board 909. In some embodiments, the light mask 912 can be taped to the inside of the housing of the device 802. The light mask 912 can be constructed using a thin plastic Mylar® tape or other type of stretched polyester film or plastic that is at least semi-opaque. The light mask 912 can be a dark color, such as black, on the inside to absorb excess light emitted by the LEDs 910 and to keep the excess light from reflecting around the interior of the device 802. One of the benefits of using the light mask 912 is that it helps ensure that the light emitted from the LEDs 910 follows the path through the light guide 908 described below instead of being dispersed throughout the interior of the device 802.

The device 802 also includes the circuit board 909 with two LEDs 910 mounted on the circuit board 909. In order to minimize the cost and component count for the device 802, a minimum number of two LEDs may be used to generate the light ring. The LEDs may include RGB LEDs that are top-firing, or which emit light from the top of the LED perpendicular to the circuit board 909. In some embodiments, the LEDs 910 can be mounted at 3 o'clock and 9 o'clock on the circuit board 909. In the embodiment shown in FIG. 9, the left LED is mounted between 9 o'clock and 10 o'clock on the circuit board 909, and the right LED is mounted between 2 o'clock and 3 o'clock on the circuit board 909. This nonsymmetric mounting pattern can be explained by the orientation of the device 802 when mounted to the wall. When mounted, the portion of the light ring at 12 o'clock will be closest to the users, while the portion of the light ring at 6 o'clock will be almost nonvisible. Therefore, the LEDs 910 may be rotated towards 12 o'clock to provide more light where it is most visible to users. Some embodiments also include a third LED 911 that can be used for a "pathlight" feature. The third LED 911 can be a white LED that is activated in low-light situations.

The device 802 may also include a light guide 908. As described above, the light guide 908 may include two cutouts that correspond to the LEDs 910 on the circuit board 909. In other embodiments, the light guide 908 may instead include flat interfaces on the bottom that can be positioned above the LEDs 910. In some embodiments, the light guide 908 may be entirely clear and translucent. In other embodiments, the light guide 908 may instead be doped with a white powder, such as titanium dioxide, to create a milky or semi-translucent effect. By doping the plastic of the light guide 908, this creates the effect of softening the light before it is omitted from the device 802. Additionally, the doping of the light guide 908 may cause the light to scatter internally and spread out in the light guide 908 before it is emitted.

Scattering the light internally in the light guide 908 can have beneficial effects for generating a uniform light ring appearance. Specifically, as described above, the thickness of the light guide 908 tapers as it moves away from the LEDs 910. The light guide is thickest directly above the LEDs 910. As the light emitted by the LEDs 910 moves through the light guide 908 towards the top and bottom (12 o'clock and 6 o'clock) of the light guide 908, the thickness of the light guide 908 tapers. Because the light guide 908 is thickest above the LEDs, the light that is directly emitted from the LEDs is softened and diffused. As the light spreads to the portions of the light guide 908 that are not directly above the LEDs 910, the thinner portions of the light guide 908 do not scatter the light as much. This tapered effect of the light guide causes the overall output of the light guide 908 to be nearly uniform when emitted. The portions of the light guide 908 that taper as they rotate away from the position of the LEDs 910 may be referred to as the transmissive regions of the light guide 908 with a thickness that tapers as it extends away from the LEDs 910 as described above.

The light guide 908 may include a substantially circular output surface 907 at the top of the light guide 908. The top, polished ring of the light guide 908 can serve as an output of the light ring. As used herein, the term "substantially circular" means that the circular nature of the output ring is approximately circular. Specifically, any semi-major axis and semi-minor axis of the circular shape will be within 25% of each other. This allows for slightly elliptical or oval rings that are still substantially circular. Additionally, a substantially circular ring may include discontinuities, such as the fixture for the third LED 911 in FIG. 9. To be "substantially circular," the output surface may allow as much as 25% of the ring as discontinuities or interruptions in an otherwise smooth output surface.

The light guide 908 may also include a reflective mask 925 that is adhered to the outside surface of the light guide 908. The reflective mask prevents light from escaping the light guide 908. In some embodiments, the reflective mask 925 may be black on the outside and white on the inside. The white interior can reflect light internally in the light guide 908, while the black exterior may prevent light from leaving the light guide 908. In some embodiments, the interior surface of the light guide 908 need not include another reflective mask. This may reflect difficulties in assembling the device 802 and adhering a separate light mask to the inside of the light guide 908. Instead, the device 802 may include a rubber gasket 906 that fits on the inside of the light guide 908. The rubber gasket fits around the PIR sensor 904 and isolates light from the light guide 908 from interfering with the PIR sensor 904. Additionally, the device 802 may include a pet-rejection mask 902 that blocks a lower portion and the sides of the PIR sensor 904 such that normal pet movements (e.g. a dog, a cat) do not trigger the PIR sensor 904. Both the rubber gasket 906 and the pet-rejection mask 902 aid in keeping the light from the LEDs 910 inside the interior of the light guide 908.

The cover 806, the-rejection mask 902, the rubber gasket 906, and the light guide 908 can be assembled together as a single assembly that is free to rotate slightly in a hinged motion up-and-down to provide the push-button functionality described above. This means that the light guide 908 will move independent of the circuit board 909 and the LEDs 910. Thus, in some embodiments, pressing the cover 806 can cause the light guide 908 to move closer to the LEDs 910 on the circuit board 909. This can cause the light captured by the light guide 908 to increase as it moves closer to the LEDs 910. Consequently, this can also cause the intensity of the light emitted by the substantially circular output surface 907 to increase when the button is depressed. Thus, this implementation can provide the benefit of increasing the intensity of the light ring momentarily when the button is depressed.

Figure 10:
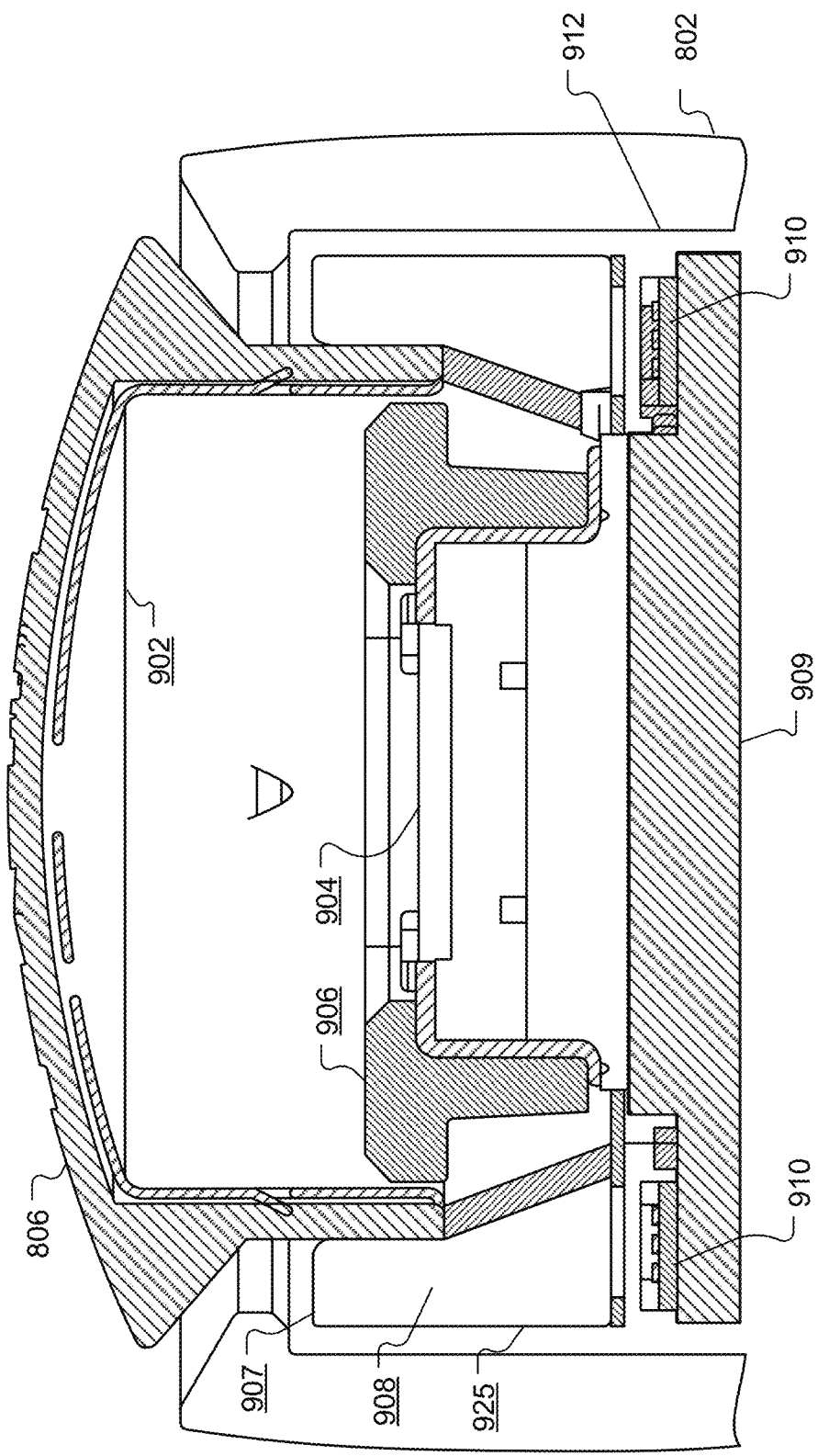
FIG. 10 illustrates a side view of the light ring assembly from FIG. 9, according to some embodiments.

FIG. 10 illustrates a side view of the light ring assembly from FIG. 9, according to some embodiments. This view illustrates the small gap between the LEDs 910 and the bottom of the light guide 908. As the cover 806 is depressed and the light ring assembly moves inward, the bottom surface of the light ring 908 will come closer to, and possibly even contact, the top of the LEDs 910. This view also shows how the cover 806 and the rubber gasket 906 provide a light mask on the interior of the light guide 908 to prevent light from escaping from the interior of the light guide 908.

FIG. 10 also illustrates how the light that is omitted from the substantially circular output surface 907 may not be directly viewable by a user. Instead, the light output from the light guide 908 may be reflected off of the body of the device 802 and/or the cover 806. This reflected light may cause a portion of the device 802 near the cover 806 and substantially circular output surface 907 to produce a localized glow effect that is secondary to the actual reflected light from the light guide 908.

Figure 11:
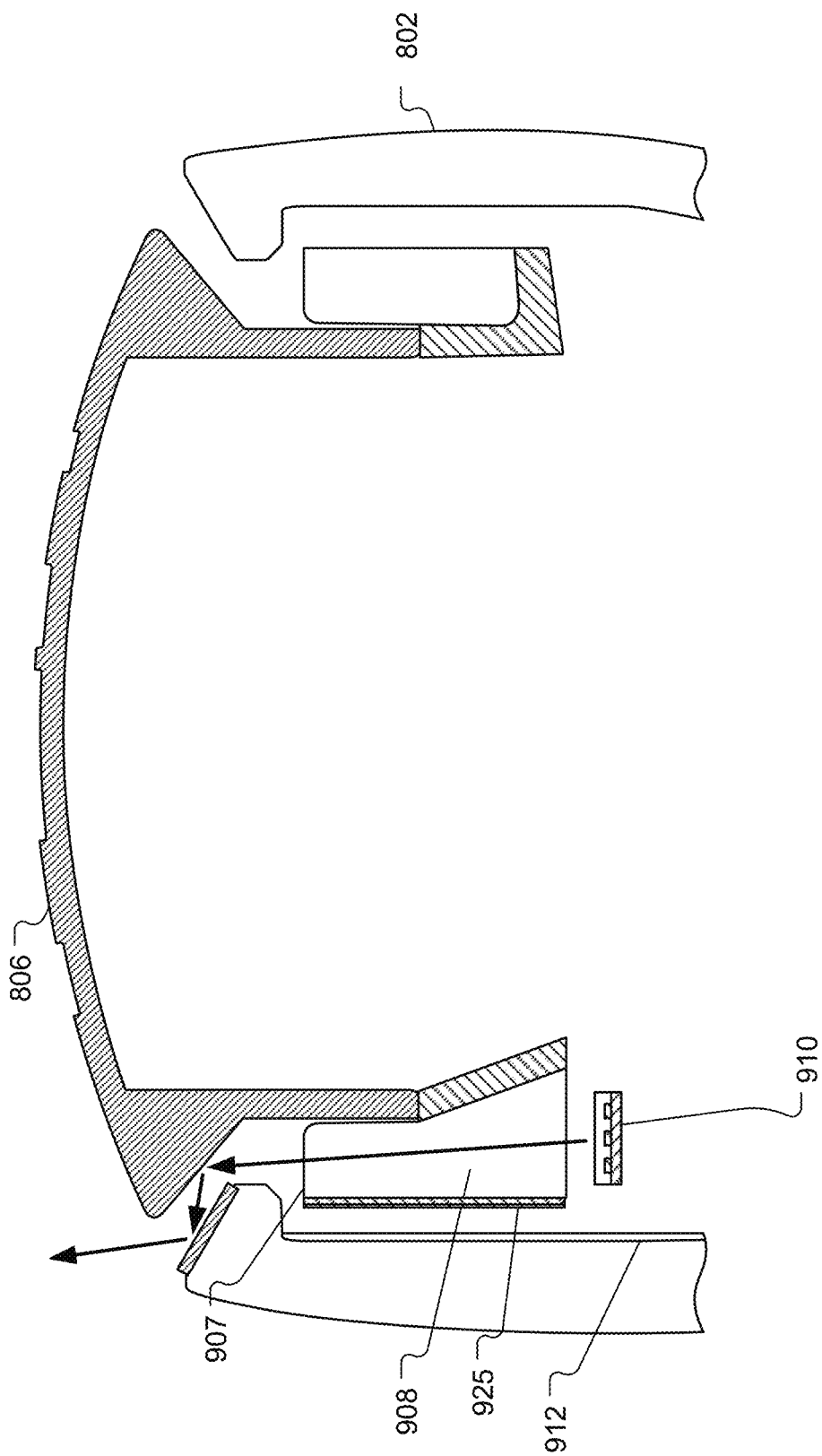
FIG. 11 illustrates a cross-sectional view of the light path exiting the device, according to some embodiments.

FIG. 11 illustrates a cross-sectional view of the light path exiting the device 802, according to some embodiments. As light exits the LED 910, it is captured by the bottom side of the light guide 908. The light mask 925 on the outside of the light guide 908 internally reflects the light inside of the light guide 908 to ensure that the light travels upwards rather than scattering within the device 802. Similarly, the cover 806 and the rubber gasket 906 keeps light inside of the interior of the light guide 908. In FIG. 11, the light is traveling straight up from the LED 910. However, as described above, light will also travel around the light guide through the tapered transmissive sections and reflect off the bottom of the tapered sections to travel upwards out of the substantially circular output surface 907.

After exiting the light guide 908, the light may reflect off of the overhang of the cover 806. Some of the light may be absorbed by the cover 806 giving a glowing effect to the outer rim of the cover 806. The light is reflected will been be reflected off of the housing of the device 802. In some embodiments, this reflection can occur off of the plastic of the case of the device 802. The plastic may be white or another light opaque color. Some embodiments may also include a piece of reflective tape on the portion of the cover of the device 802 on which the light is reflected.

Figure 12:
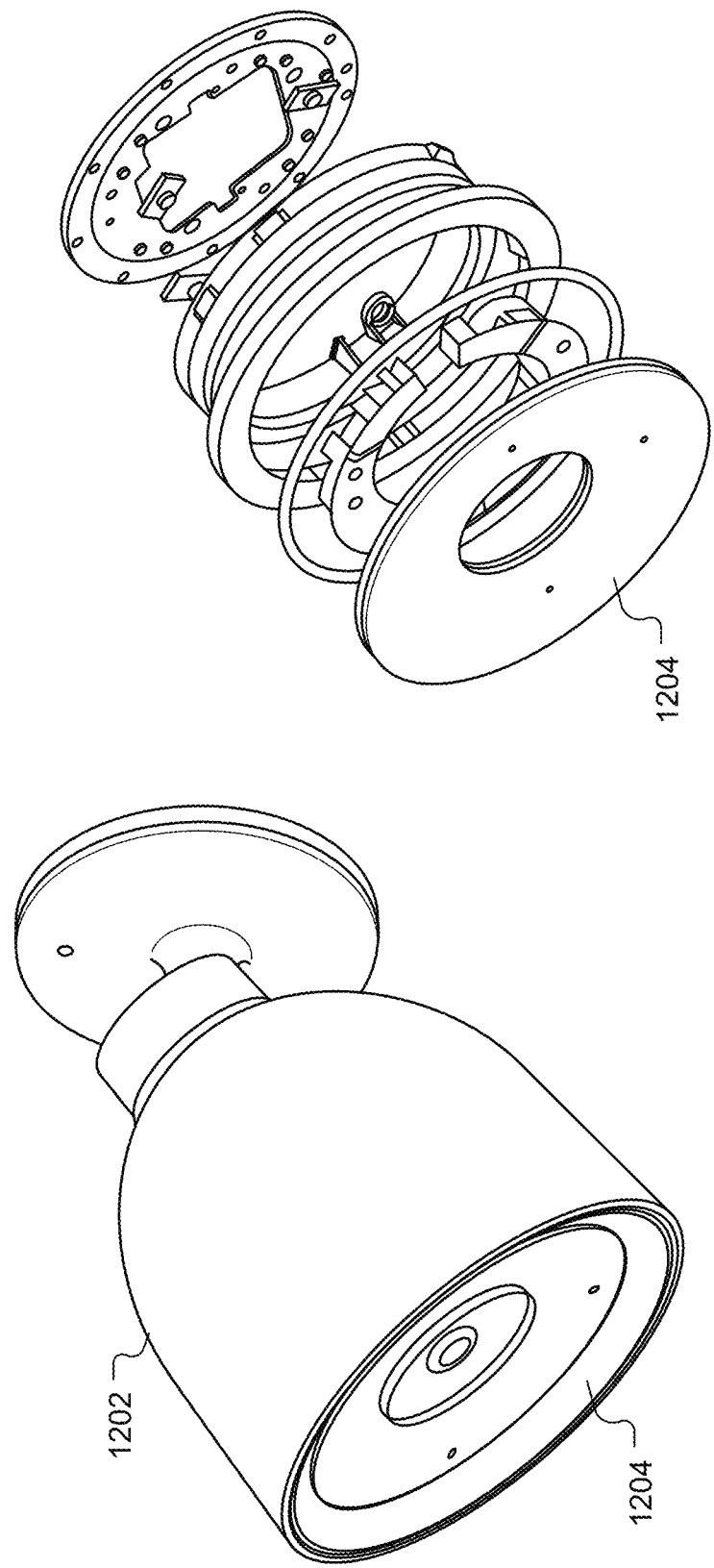
FIG. 12 illustrates a second implementation of a smart device that can be installed in a smart-home environment, according to some embodiments.

FIG. 12 illustrates a second implementation of a smart device 1202 that can be installed in a smart-home environment, according to some embodiments. This device 1202 may comprise a video camera that is designed for use both indoors and outdoors. The camera may include a robust housing that provides for a camera input at the center of the front lens 1204. Around a periphery portion of the front lens 1204, the device 1202 may also include a light ring that is illuminated such that the device 1202 can record in low-light environments. The light ring may also become illuminated when the device 1202 detects motion or a human presence within its field of view.

Figure 13:
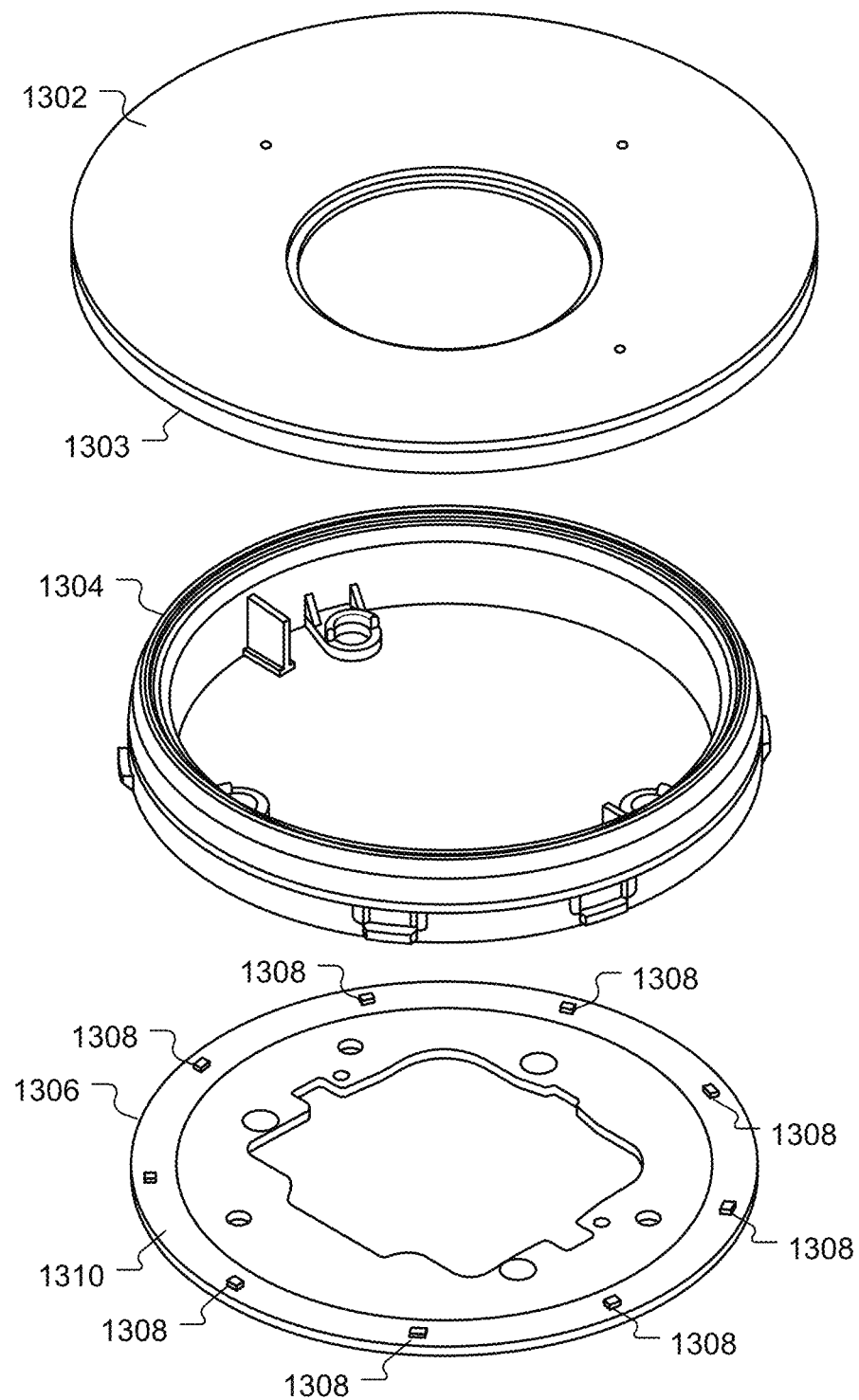
FIG. 13 illustrates some of the internal components of the device.

FIG. 13 illustrates some of the internal components of the device 1202. As was visible in FIG. 12, the device may include an outer cover 1302. The outer cover 1302 may include a diffusing layer 1303 on the bottom. The diffusing layer 1303 receives light from the two-shot light guide 1304 described below. The diffusing layer 1303 slowly extracts the light from the focused output of the light guide 1304 and diffuses the light in a gradient-like fashion. This generates an intense light ring right near the edge of the diffusing layer 1303 that slowly decays. In contrast to the device 802 described above, the user will see the actual light diffused through the diffusing layer 1303 rather than viewing reflected light that is reflected off of other surfaces on the device 1202.

The device 1202 also includes a circuit board 1306. In order to generate a uniform light ring, the circuit board 1306 may include a plurality of LEDs 1308. The LEDs used in this particular embodiment are top-firing LEDs that emit light perpendicular to the circuit board 1306. In this embodiment, nine LEDs 1308 have been evenly distributed around a circular pattern on the periphery of the circuit board 1306. In other embodiments, more or fewer LEDs 1308 may also be used. In practice, the number of LEDs 1308 may be increased until the output of the light ring appears uniform. Additionally, the circuit board 1306 may include a white solder mask 1310 that is applied to the top side of the circuit board 1306 around the LEDs 1308. Any light output from the LEDs 1308 that is scattered or not received by the light guide 1304 can be reflected by the white solder mask 1310.

One of the difficulties encountered in the design of the device 1202 is generating a uniform light ring output through the diffusing layer of the outer cover 1302 using a small number of discrete LEDs 1308. Without the unique design features described below in the light guide 1304, the output of the light ring would appear to have "hotspots" above each of the LEDs 3008. Thus, the output would look entirely nonuniform and may distract users. The light guide 1304 is manufactured to include certain features that scatter and reflect light such that the output along the substantially circular output surface at the top of the light guide 1304 is nearly uniform.

Figure 14:
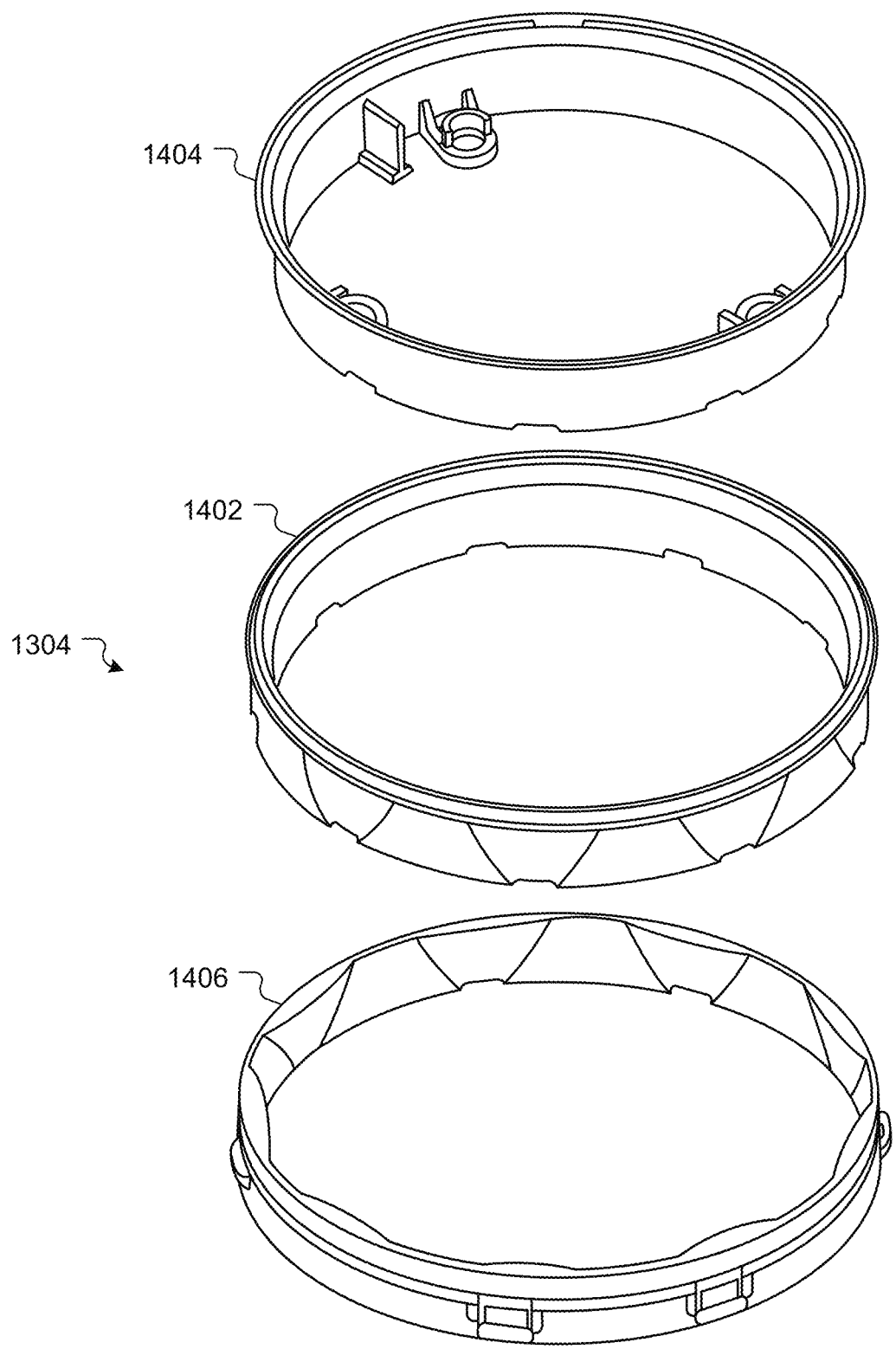
FIG. 14 illustrates the three different pieces of the light guide.

FIG. 14 illustrates the three different pieces of the light guide 1304. A middle layer 1402 of the light guide 1304 can be cast from a transparent plastic. After the middle layer 1402 is cast, an inside layer 1404 and an outside layer 1406 can be cast around the middle layer 1402 using a 2-shot process. The inside layer 1404 and the outside layer 1406 can be cast from an opaque plastic. Therefore, the inside layer 1404 and the outside layer 1406 can form a light mask around the middle layer 1402. The only portions of the middle layer 1402 that are exposed are the circular ring along the bottom of the middle layer 1402 that will be up against the circuit board 1306, and a small ring around the top of the middle layer 1402 that will act as the substantially circular output surface for the light guide 1304.

Figure 15:
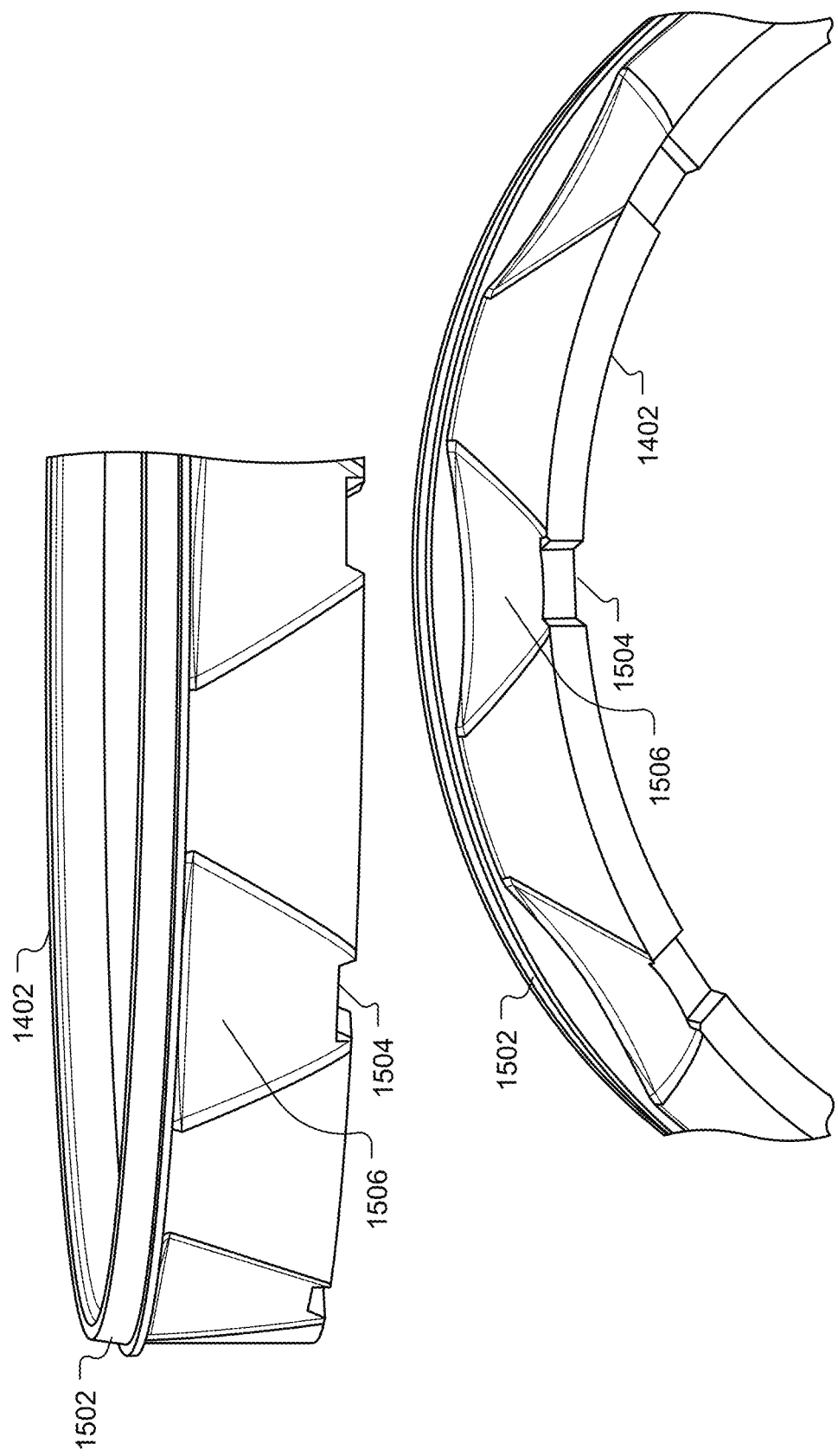
FIG. 15 illustrates a view of the middle layer of the light guide, according to some embodiments.

FIG. 15 illustrates a view of the middle layer 1402 of the light guide 1304, according to some embodiments. The substantially circular output surface 1502 runs along a top exterior of the middle layer 1402. The bottom of the middle layer 1402 includes a plurality of cutouts 1504 that are sized and spaced to accept each of the LEDs 1308 on the circuit board 1306. The spaces in between the cutouts 1504 can be pressed up against the circuit board 1306 to prevent light from leaking out of the cutouts 1504.

The middle layer 1402 also includes a plurality of transmissive sections 1506 between the cutouts 1504 for the LEDs. Each of a transmissive sections 1506 is scalloped to help guide the light from the LEDs to the substantially circular output surface 1502. Specifically, as the transmissive sections 1506 extend away from the cutouts 1504, each of the transmissive sections 1506 has a thickness that tapers as they extend away from the cutouts 1504. Each of the transmissive sections 1506 becomes thinnest at the point directly above the cutouts 1504. As the transmissive sections 1506 radiate outward from a line extending directly above the cutouts 1504, the tapering becomes less pronounced. This produces a scalloped profile along the exterior of the middle layer 1402.

The effect of the scalloped profile of the transmissive sections 1506 is to scatter the light from the LEDs uniformly around the output surface 1502. The scalloped design gradually reflects light as it travels upward through the middle layer 1402 so that by the time the light reaches the top, it is fairly uniformly distributed. This allows the light to spread naturally throughout the light guide along the transmissive sections 1506. Physically, this has the effect of aperturing how much light gets through directly above the LEDs. Because the light guide becomes thinner, the amount of light is choked above the LEDs and reflected to the areas between the LEDs where the excess light is needed.

Figure 16:
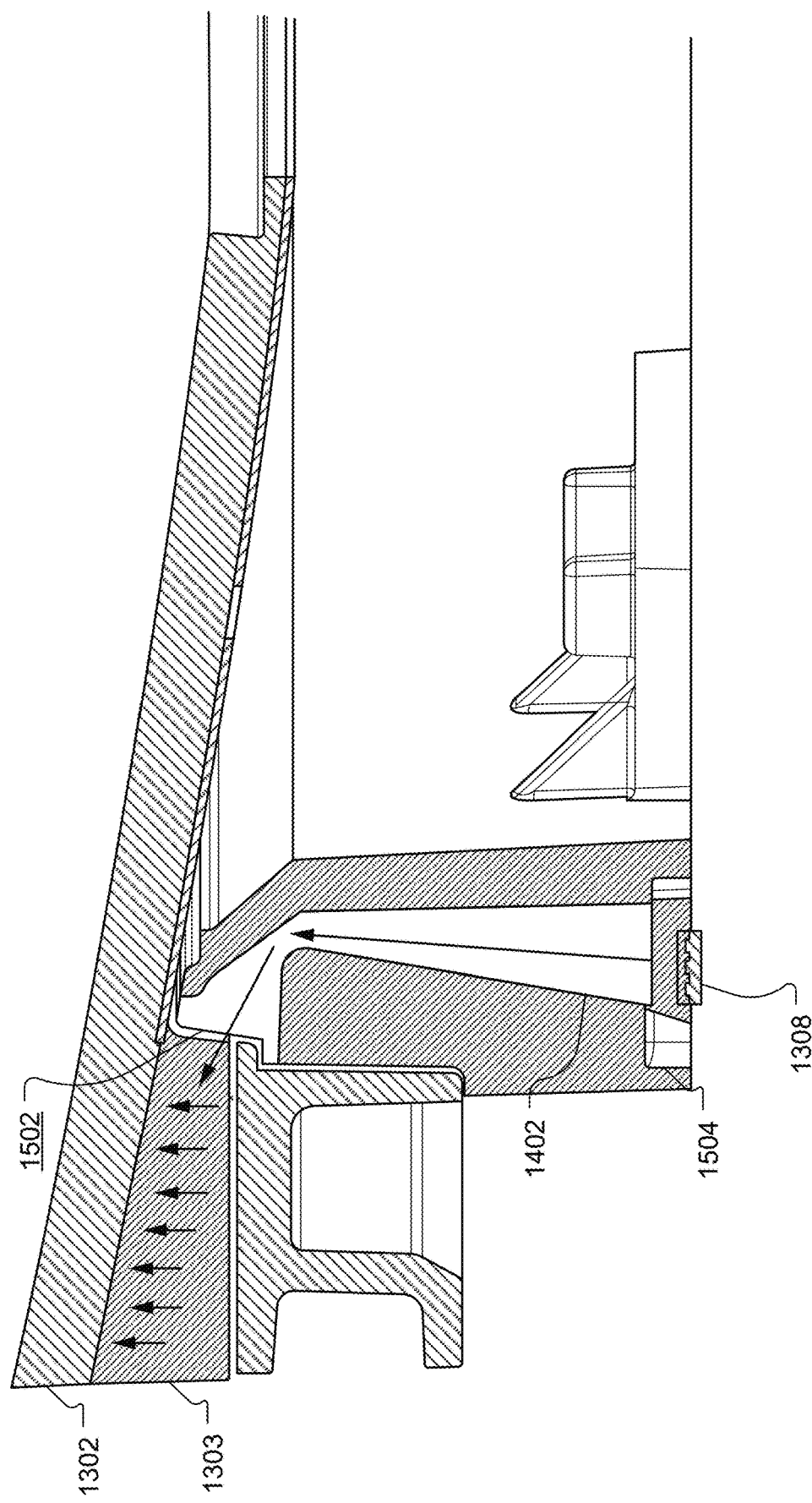
FIG. 16 illustrates a cross-sectional view of the device that shows the light path, according to some embodiments.

FIG. 16 illustrates a cross-sectional view of the device 1202 that shows the light path, according to some embodiments. The light is initially emitted from the LEDs 1308, each of which resides within one of the cutouts 1504 in the light guide. The light travels up the middle layer 1402 of the light guide as described above, such that the light is scattered and uniformly emitted from the substantially circular output surface 1502. After exiting the output surface 1502 of the light guide, the light enters the diffusing layer 1303 where light is further scattered and softened before it is channeled upwards through the outer cover.

Figure 17:
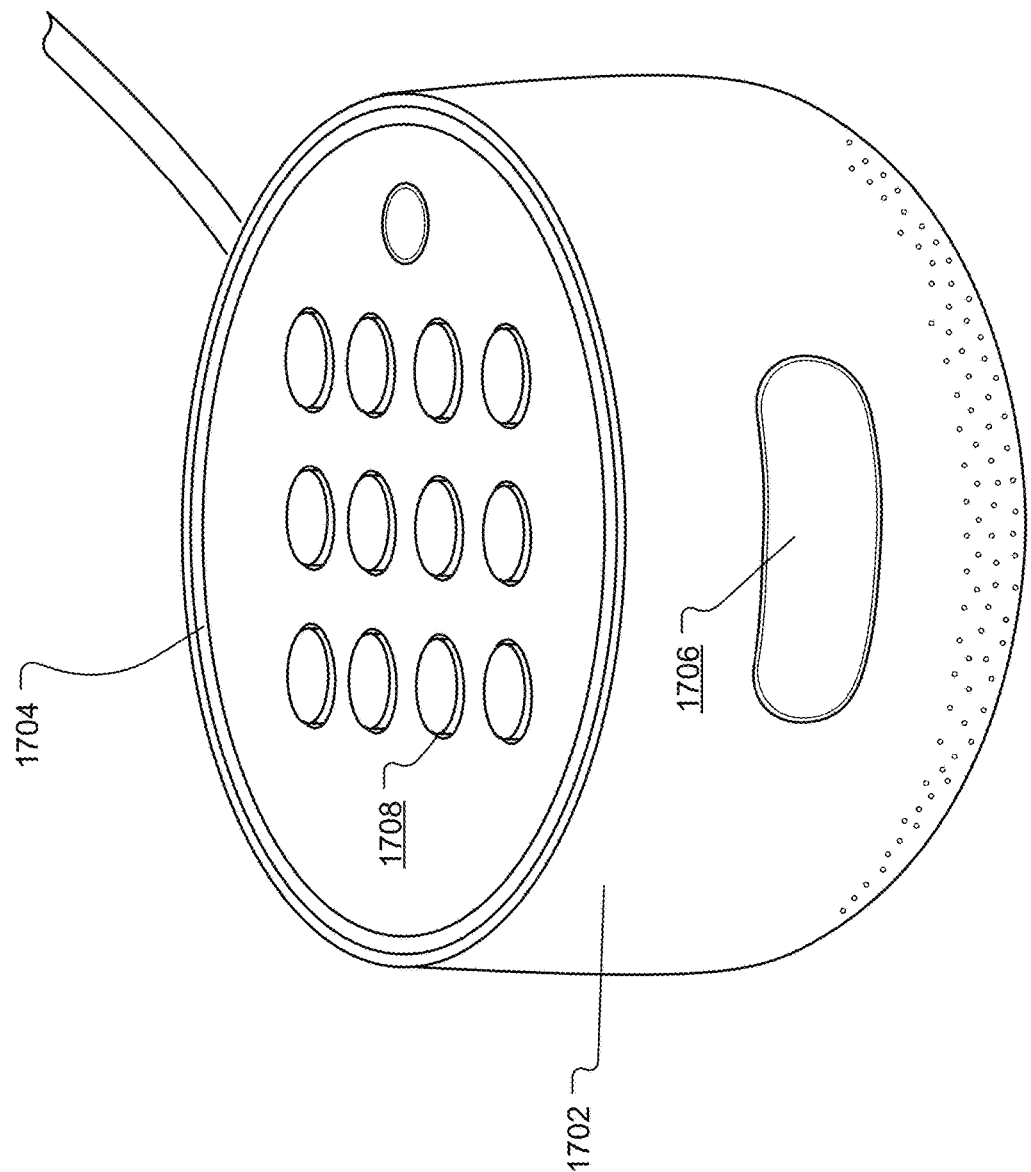
FIG. 17 illustrates a device that can be used as part of a home security system or smart-home environment, according to some embodiments.

FIG. 17 illustrates a device 1702 that can be used as part of a home security system or smart-home environment, according to some embodiments. The device 1702 includes a keypad 1708 that can be used to authenticate a user, activate/deactivate a home security system, program smart-home devices, dial phone numbers, enter security codes, and so forth. The device 1702 may also include a motion sensor 1706 positioned on the side of the device 1702. The motion sensor 1706 can be used to detect a user approaching the device 1702 to use the device. The motion sensor 1706 can also be used as a motion and/or intrusion detection system in conjunction with other PIR sensors spread throughout the smart-home environment.

When the device 1702 detects a user approaching the device 1702 using the motion sensor 1706, the device 1702 can cause the light ring 1704 to light up to facilitate user interaction. In other cases, when the keypad 1708 detects a user interacting with the device 1702 (e.g., pressing the buttons of the keypad 1708), the device 1702 can cause the light ring 7004 to light up. The light ring 1704 may encircle the perimeter of the top of the device 1702 and may emit enough light that the keypad 1708 is illuminated such that a user can see the buttons being depressed in a dark environment. Like the uniform light rings discussed above, the light ring 1704 can be powered by a plurality of discrete LEDs. Despite the tendency of the light ring 1704 to the brightest at the locations of the LEDs, the design describe below causes the light ring 1704 to appear to be uniformly illuminated around the circular output surface.

Figure 18:
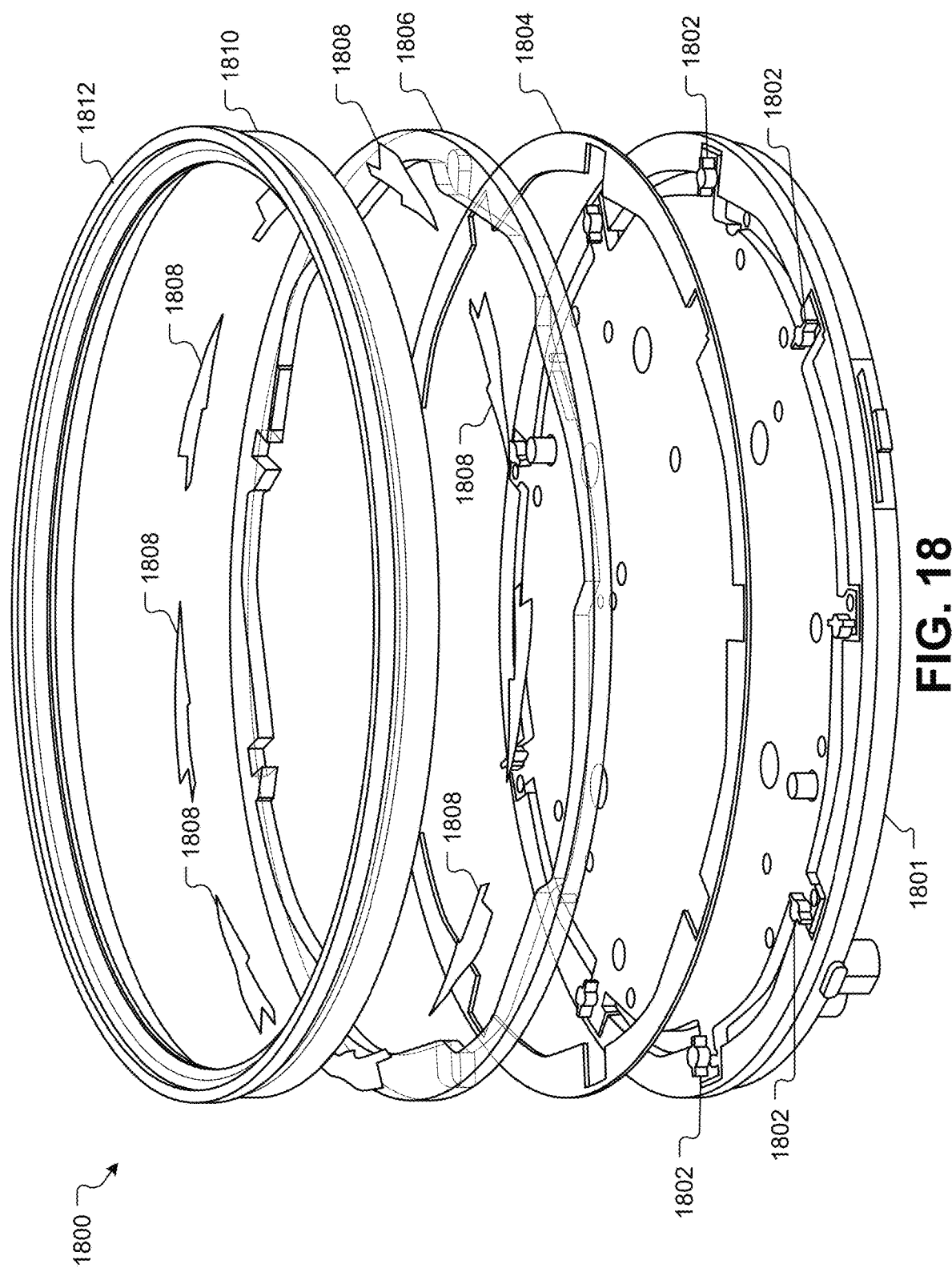
FIG. 18 illustrates a light ring assembly for a device having a keypad, according to some embodiments.

FIG. 18 illustrates a light ring assembly 1800 for a device 1702 having a keypad, according to some embodiments. The light ring assembly 1800 includes a circuit board 1801. The circuit board includes a plurality of LEDs 1802 that are distributed evenly in a circular pattern about the periphery of the circuit board of 1801. The LEDs 1802 in this embodiment may be side-fire LEDs where light is emitted from the side of the LEDs 1802 in a direction that is parallel to the surface of the circuit board 1801. The LEDs 1802 can be RGB LEDs, or any other type of board-mounted LEDs. Although not shown explicitly in FIG. 18, the circuit board 1801 may include mechanical mounting features, and other electronic components that are integral to the keypad assembly or other internal electronics of the device 1702.

On the top of the periphery of the circuit board 1801, the light ring assembly 1800 may include a mask 1804. The mask may be comprised of a thin Mylar tape, thin plastic layer, or other opaque material that will reflect light that is emitted from the LEDs 1802. The mask 1804 can be coupled to the bottom of a light guide 1806. Like the light guides described above, the light guide 1806 can be formed from a translucent or semi-translucent piece of plastic. As will be described in greater detail below, the light guide 1806 includes geometric formations, such as a tapered transmissive section, along with features such as micro-lenses that cause the light to be emitted through a circular output surface uniformly.

Some embodiments may also include tape masks 1808 that are precut in specific geometric patterns that maximize the uniformity of the light that is transmitted vertically out of the light guide 1806. In this embodiment, each of the LEDs 1802 has a corresponding tape mask 1808 secured to the light guide 1806 above a portion of the LEDs 1802. The tape masks 1808 can be reconfigured to attenuate the amount of light that is transmitted upwards directly over the LEDs 1802 where the light emitted from the LEDs 1802 is the most intense. As the tape masks 1808 taper, they can gradually allow more light to exit the light guide 1806 into an output ring 1810. The output ring 1810 may also be formed of a translucent or semi-translucent plastic that can direct the light through a substantially circular output surface 1812 that is exposed to the top of the device 1702. In some embodiments, the output ring 1810 can be doped with material to cause the light to diffuse before is omitted from the output surface 1812.

Figure 19:
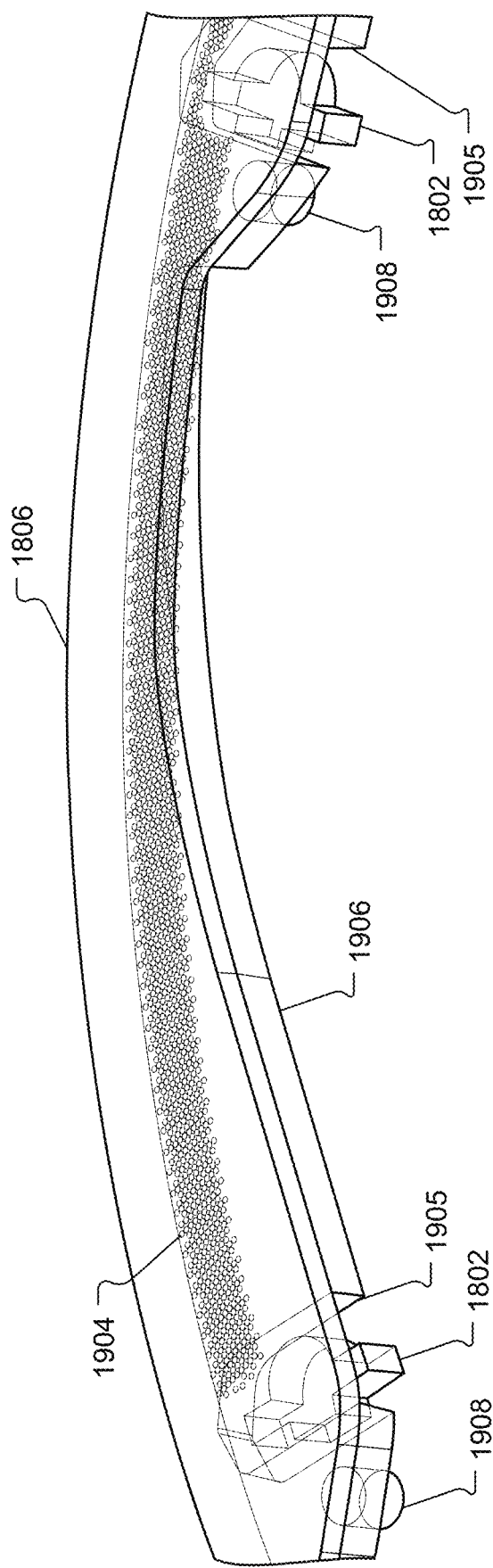
FIG. 19 illustrates a detailed view of the light guide, according to some embodiments.

FIG. 19 illustrates a detailed view of the light guide 1806, according to some embodiments. The light guide 1806 may include a plurality of cutouts 1905 that are sized to accept the side-firing LEDs 1802 that are mounted to the circuit board 1801. A portion of the cutouts 1905 may be substantially flat in front of the LEDs, or alternatively may be shaped to conform to a shape of the LEDs 1802. The light guide 1806 may also include a plurality of features 1908 that can be mated with mounting features on the circuit board 1801 to ensure that the LEDs 1802 line up with the cutouts 1905 in the correct orientation and direction.

Between the cutouts 1905 of each pair of LEDs 1802, the light guide 1806 may include a transmissive section 1906. As with the other embodiments described above, the transmissive section 1906 can gradually taper in thickness as it extends away from the LEDs 1802 in the direction that the light from the LEDs 1802 is traveling. As described above, this has the effect of channeling a majority of the light from the LEDs 1802 down the transmissive section 1906 away from the LEDs 1802. This channels light away from the LEDs 1802 such that it can be reflected vertically out of the light guide 1806 evenly throughout the transmissive sections 1906. Without this tapering effect, the majority of the light from the LEDs would exit the light guide 1806 directly in front of the LEDs 1802, causing an intense bright spot in the light ring and causing it to not have a uniform light output.

In this embodiment, the light guide 1806 includes a second feature in addition to the tapered transmissive sections 1906 that is configured to generate a uniform light output in the light ring. Specifically, the light guide 1806 includes a plurality of micro-lenses 1904 that are formed on a bottom side of the light guide 1806. The micro-lenses act as a scattering features that stop the light from traveling down the transmissive section 1906 of the light guide and instead cause the light to scatter and reflect in an upward direction perpendicular to the circuit board 1801 and the light guide 1806. In some embodiments, the micro-lenses 1904 may include a plurality of hemispheres or cut-outs that are highly polished and cut out into the bottom side of the light guide 1806. Because the surfaces of the light guide 1806 are highly polished, most of the light would continue moving down the transmissive section 1906 of the light guide 1806 due to total internal reflection (TIR) without reflecting upwards into the output ring 1810. The micro-lenses disrupt the TIR and cause the light to exit the light guide 1806 in a uniform fashion throughout the length of the transmissive section 1906.

The micro-lenses 1904 can be formed in the bottom surface of the light guide 1806 using laser etching. In other embodiments, the micro-lenses 1904 may be formed using diamond turning. Generally, the more spherical and polished the shape of the micro-lenses 1904, the more light will be reflected properly. In some embodiments, prototypes or test patterns of micro-lenses 1904 can be generated using a laser cutter. Some embodiments may include micro-lenses 1904 that are approximately 50 microns deep for a light guide 1806 that is approximately 1.5 mm wide in the vertical direction. Generally, the size and depth of the micro-lenses 1904 can be proportional to the vertical width of the light guide 1806. If they are too large compared to the vertical width of the light guide 1806, then too much light may be reflected too early in the transmissive section 1906. At the same time, if the relative size of the micro-lenses 1904 is too small, then not enough light will be reflected uniformly throughout the length of the transmissive section 1906.

The micro-lenses 1904 can have a relative density that increases throughout the length of the transmissive section 1906. Stated another way, the number of micro-lenses 1904 per unit of horizontal thickness of the light guide 1806 can increase as the transmissive section 1906 extends away from the LEDs 1802. As used for this embodiment, the "thickness" of the light guide 1806 refers to the horizontal thickness of the light guide in a direction parallel to the circuit board 1801, while the "width" of the light guide 1806 refers to a vertical width of the light guide in a direction perpendicular to the circuit board 1801. The relative density of the micro-lenses 1904 can change through the transmissive sections 1906 in different ways. In some embodiments, the spacing between the micro-lenses can decrease as the transmissive section 1906 extends away from the LEDs 1802. Thus, the micro-lenses 1904 can be more spread out close to the LEDs 1802 and arranged closer together towards the end of the transmissive sections 1906. In the embodiment shown in FIG. 19, the micro-lenses 1904 can alternatively have a uniform spacing throughout the length of the transmissive section 1906, but the relative density of the micro-lenses 1904 can change based on the thickness and the tapering of the transmissive section 1906.

In the embodiment of FIG. 19, the thickest portion of the transmissive section 1906 that is less populated with micro-lenses 1904 allows the light from the LED 1802 to travel down the length of the transmissive section 1906 without being reflected upwards. The relatively few number of micro-lenses 1904 close to the LEDs 1802 causes only a portion of the light to be reflected upwards near the LEDs 1802. Because the light is most intense near the LEDs, and because some light from the LEDs 1802 will be initially directed upwards from the LED itself 1802, fewer micro-lenses 1904 are required to reflect light upwards near the LEDs 1802. However, as the light travels down the transmissive section 1906, the tapering effect of the thickness of the transmissive sections 1906 will cause the light to intersect with more of the micro-lenses 1904, causing a uniform amount of light to be reflected upwards by the micro-lenses 1904. This gradual density increase causes a uniform amount of light to be reflected upwards by the micro-lenses 1904 along the length of the transmissive section 1906. The combination of the tapering of the transmissive sections 1906 and the relative density of the micro-lenses 1904 generates a uniform light ring output from the plurality of discrete LEDs 1802.

Figure 20:
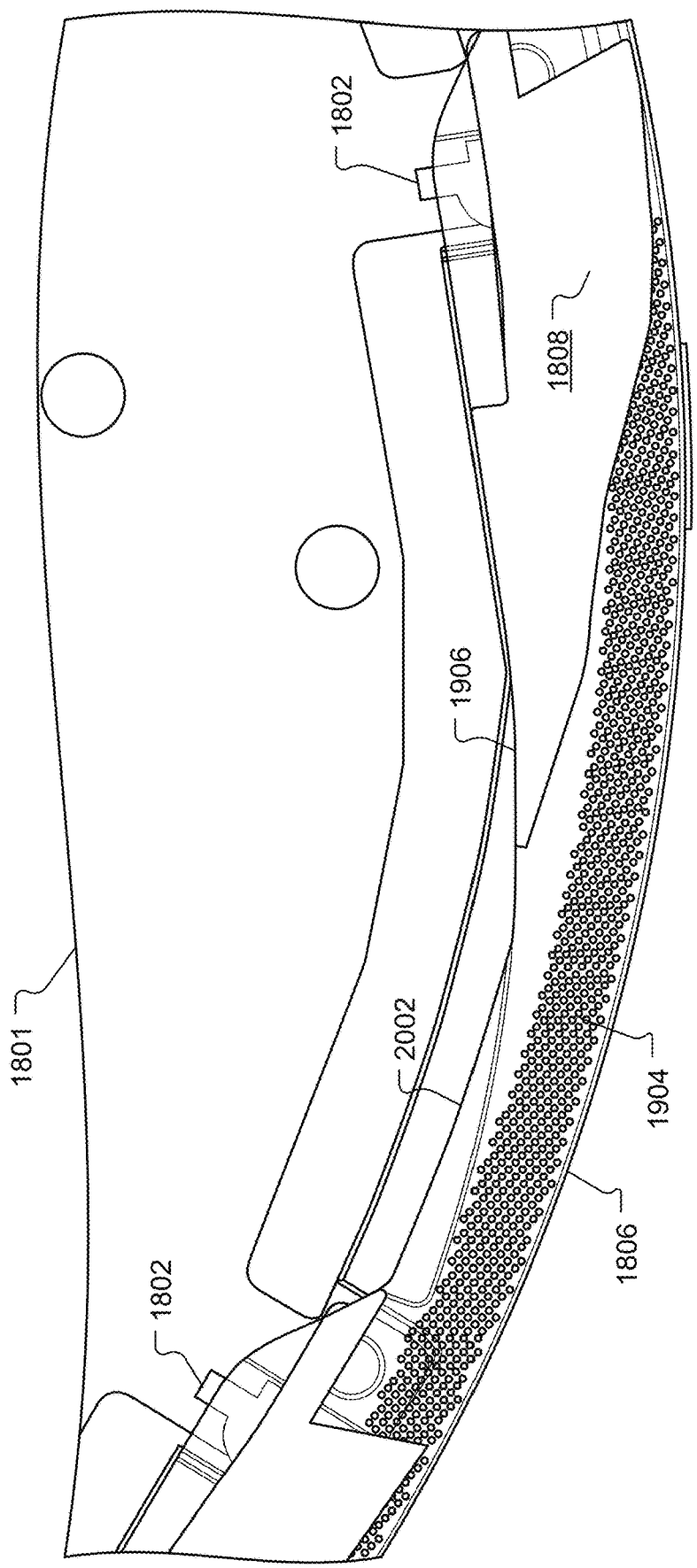
FIG. 20 illustrates a top view of the light guide with the tape masks applied to the top of the light guide, according to some embodiments.

FIG. 20 illustrates a top view of the light guide 1806 with the tape masks 1808 applied to the top of the light guide 1806, according to some embodiments. The tape masks 1808 can be die cut pieces of light-blocking tape. In some embodiments, both sides of the tape masks 1808 can be white to reflect light, and the middle layer of the tape can be a light blocking and/or dark material. The tape masks 1808 may have the effect of shielding at least a portion of the initial bright output of the LEDs 1802 from the output ring 1810. The shape of the tape masks 1808 can be easily experimented with and tunable based on each individual embodiment. The shape of the tape masks 1808 in FIG. 20 is specifically tuned to the shape of the specific light guide 1806.

In this embodiment, the tape masks 1808 include cutouts around the LEDs 1802 that are configured to allow just enough light emitted from the LEDs 1802 to be reflected directly upwards without overwhelming that section of the output ring 1810. The cutout behind the LEDs 1802 allow a portion of indirect light to escape upwards from the previous LED in the circle. Each individual embodiment can use different patterns of tape masks 1808 to generate a uniform light ring. This can be done by experimentation. For example, different configurations of tape masks 1808 can be applied, and camera images can be taken of the light outputs. The light image of the light ring can be divided into a plurality of sectors (e.g., 360 sectors, and the pixels in each sector can be averaged. Plots can be generated of the light intensity versus the rotation angle around the light ring. This plot can show exactly where in each rotation more light needs to be allowed to exit the light guide 1806, and where more light needs to be blocked by a tape masks 1808.

FIG. 20 also illustrates a shelf 2002 in the light guide 1806. The shelf 2002 may be a piece of plastic on the light guide 1806 that does not taper with the rest of the transmissive section 1906. The shelf 2002 can be on a bottom portion of the transmissive section 1906 and can be relatively thin such that only a small amount of light travels down the shelf 2002 instead of being forced over the micro-lenses 1904. The shelf 2002 can be formed in the light guide 1806 to provide structural support for the small end portion of the transmissive section 1906. By making the shelf 2002 relatively thin and near the bottom of the light guide 1906, the effect of the shelf 2002 on the light being uniformly emitted as it runs through the micro-lenses 1904 can be minimized.

Figure 21:
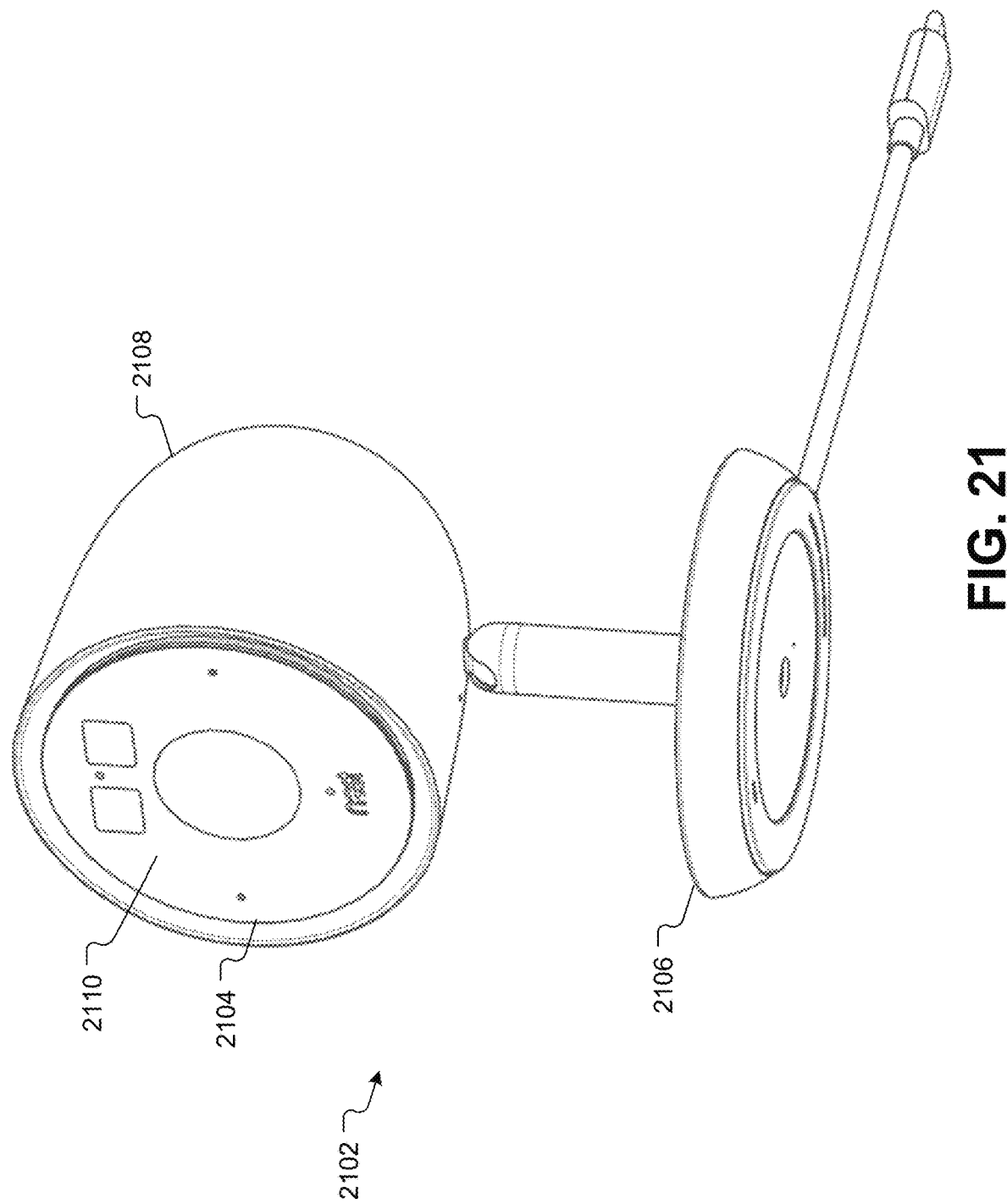
FIG. 21 illustrates a device that can be used as an indoor imaging camera, according to some embodiments.

FIG. 21 illustrates a device 2102 that can be used as an indoor imaging camera, according to some embodiments. The camera device 2102 includes a stand 2106 for positioning a direction of a head unit 2108 of the camera device 2102. The head unit 2108 can include a front face that includes a cover 2110. The cover 2110 may include apertures or windows for microphones, infrared (IR) illuminators, the camera sensor assembly itself, an ambient light sensor, and/or other camera components. Around the periphery of the cover 2110, the camera device 2102 may include a uniform light ring 2104. As with the other light rings described herein, the light ring 2104 may be of a substantially circular shape, and may produce a uniform light ring from a plurality of discrete LEDs. The light ring 2104 can be used to illuminate the field-of-view of the camera device 2102 while recording, as well as to provide status indicators and emergency/convenience lighting for users walking by the camera device 2102.

Figure 22:
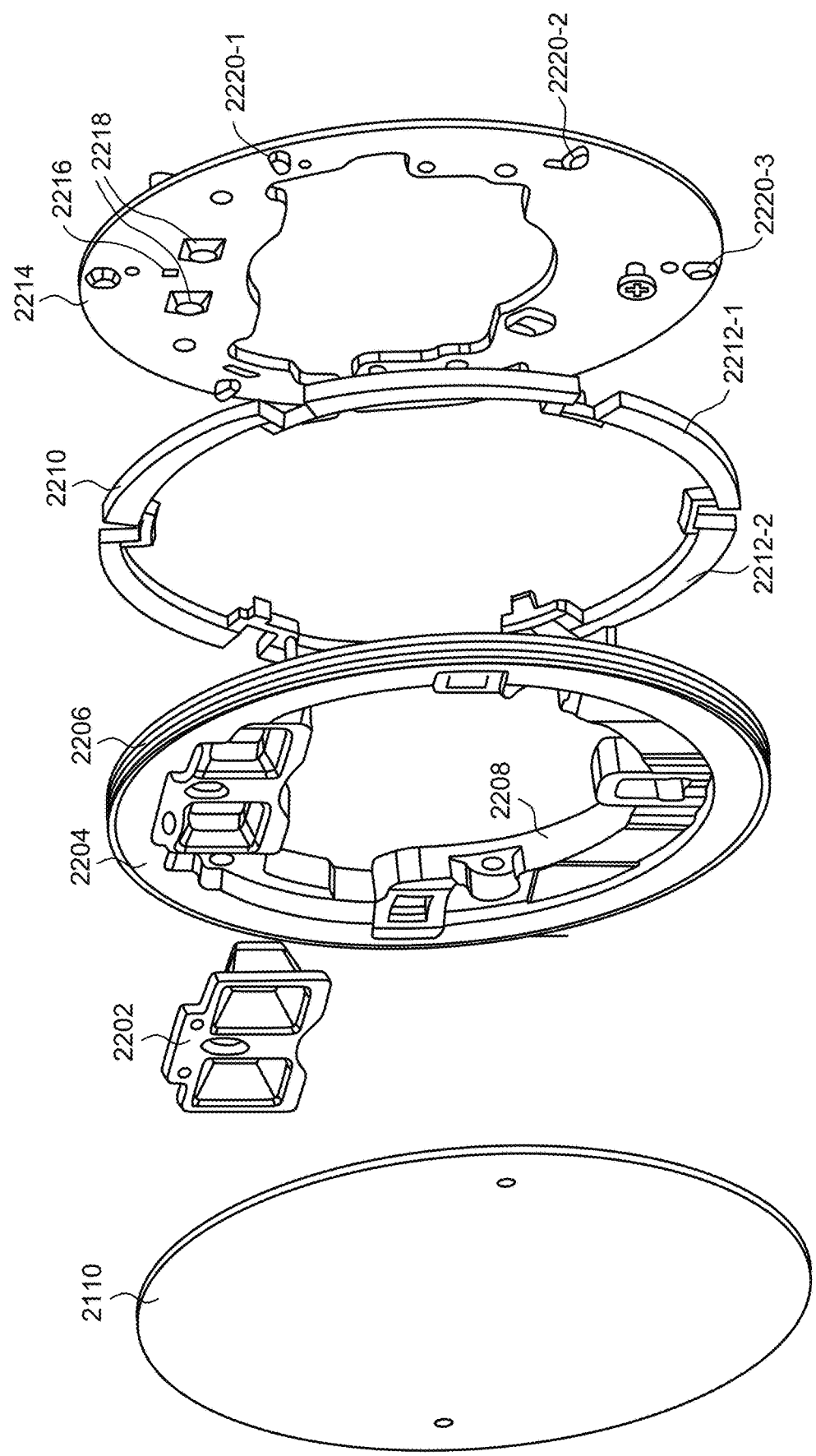
FIG. 22 illustrates a component view of a representative camera assembly of device 2102, according to some embodiments.

FIG. 22 illustrates a component view of a representative camera assembly of device 2102, according to some embodiments. This view includes a cover element assembly composed of the cover element 2110, an IR reflector 2202, a light diffuser 2204, a light guide 2210, and the circuit board 2214. In accordance with some implementations, the light diffuser 2204 includes a first (inner) section 2208 and a second (outer) section 2206. The inner section 2208 may be comprised of structural poly-carbonite. The outer section 2206 may be transparent or semi-transparent to visible light. The circuit board 2214 includes IR illuminators (e.g., IR LEDs) 2218, visible light LEDs (e.g., RGB LEDs) 2220, and an ambient light sensor 2216. The LEDs 2220 may include 6 side-firing RGB LEDs, and the LEDs 2220 may be configured to be controlled individually (e.g., controlled by a camera SoC or processor). Each LED 2220 may correspond to a portion of the light guide 2210. For example, the light guide 2210 may include a first transmissive section 2212-1 corresponding to the LED 2220-2, and a second transmissive section 2212-2 corresponding to the LED 2220-3. As shown in FIG. 22, each LED 2220 is oriented in a clockwise manner and the light guide 2210 includes a corresponding transmissive section extending from the location of the LED 2220 in a clockwise direction. In some implementations, each transmissive section of the light guide 2210 ends with, or is bounded by, a segmentor (e.g., a light-absorbing substance) that is adapted to prevent light from the LED 2220 from entering other portions of the light guide 2210. One or more surfaces of the light guide 2210 not facing the front of the camera may be coated or otherwise treated with a light absorbing substance (e.g., a black ink) to prevent light from the LEDs 2220 from exiting the light guide 2210 at that location. The LEDs 2220 may also be oriented in a non-clockwise (e.g., counter-clockwise) orientation in some embodiments.

In some embodiments, the cover element 2110 may be formed from a single-piece element (e.g., a glass or plastic lens) that resides over the entire front of the camera device 2102. In some implementations, the cover element 2110 is a single-piece cover glass having a thickness of 1 mm, or approximately 1 mm (i.e., within 25%). A light-absorbing coating (e.g., a film or ink) and anti-reflective coating may be added onto the rear of the cover element 2110 to prevent light scattering. This coating may be located between the area used for IR illumination and the image sensor entrance, all on the same piece of cover element. In some embodiments, the coating comprises a smooth, matte ink that is light-absorbing across all wavelengths of light.

In some embodiments, a first section of the cover element 2110 may be coated with an opaque film adapted to absorb visible and IR light. In some implementations, the film is an ink. Second sections of the cover element 2110 (e.g., corresponding to the IR illuminators 2218) may be coated with an IR transparent film adapted to absorb visible light (e.g., is opaque or semi-opaque to visible light). Third sections of the cover element 2110 may be coated with a film that is semi-transparent (e.g., semi-transparent to IR and/or visible light), the third sections corresponding to a status illuminator and/or an ambient light sensor. In some implementations, the cover element 2110 may be coated with an anti-reflection coating. For example, the cover element 2110 may be coated first with the thin films then with the anti-reflection coating on top of the thin films. The coatings may be applied to the inner surface of the cover element 2110. In some embodiments, at least one of the coatings may be applied to the outer surface of the cover element 2110. The cover element 2110 may have an anti-reflection coating applied to both the inner and outer surfaces. The cover element 2110 may include an opaque coating to prevent, or substantially prevent, light from the circuit board 2214 from entering the image sensor. One or more of the coatings comprise a smooth ink adapted to absorb, not scatter, light, such as an opaque ink adapted to absorb visible and IR light. One or more of the coatings may also me adapted to absorb at least 99% of the light. For example, the opaque coating may be adapted to absorb at least 99% of visible and IR light. One or more of the coatings may comprise a rough ink adapted to scatter light, may be applied via vapor deposition, via thin film deposition, via a pattern printing process, and/or via a spray-on process.

The circuit board 2214 comprises the plurality of LEDs 2220 and circuitry for powering and/or operating the LEDs 2220. The light guide 2210 may be adapted to direct light from the LEDs 2220 out the face of the camera device 2102. The light guide 2210 may also be adapted to prevent light from the LEDs 2220 from entering the image sensor assembly of the camera device 2102. The light guide 2210 may further be adapted to spread the light from the LEDs 2220 in a substantially even manner such that the output through the cover 2110 appears as a uniform light ring. The light guide 2210 may be composed of a clear material, such as a poly-carbonite material. The light guide 2210 may include a plurality of micro-lenses discussed further below to refract the LEDs 2220 and prevent the light from entering the image sensor assembly of the camera device 2102. The light guide 2210 may be adapted to provide more uniform color and light output to a user from the illuminators. As described above, the light guide 2210 includes a plurality of transmissive sections 2212, each segment corresponding to an LED 2220. Each of the transmissive sections 2212 may include one or more light absorbing elements (e.g., black stickers) arranged between each transmissive section 2212 to prevent light leakage from one LED 2220 and transmissive section 2212 combination to another transmissive section 2212.

The light diffuser 2204 may include two or more sections (e.g., an inner section and an outer section). The light diffuser 2204 is adapted to diffuse the light from the LEDs 2220. The light diffuser 2204 may also be adapted to direct the light from the LEDs 2220 toward the substantially circular output surface on top of the light diffuser 2204. The circuit board 2214 (and corresponding elements such as the light guide 2210 and/or light diffuser 2204) causes a circular colored (or white) light to be emitted from the front of the camera device 2102 as a uniform light ring. The light ring may encircle all or substantially all elements of the camera device 2102, such as the image sensor assembly, the IR illuminators 2218, the ambient light sensor 2216, a status LED, and the microphone apertures. In some implementations, the light ring may be arranged in a non-circular shape, such as a square, oval, or polygonal shape that generates a uniform light pattern around the shape.

The light ring (and corresponding elements) may operate to indicate a status of the camera device 2102, another device within or outside of the smart-home environment (e.g., another device communicatively coupled either directly or indirectly to the camera device 2102), and/or the entire connected smart-home environment (e.g., system status). The light ring (and corresponding elements) may cause different colors and/or animations to be displayed to a user that indicate such different statuses.

Figure 23:
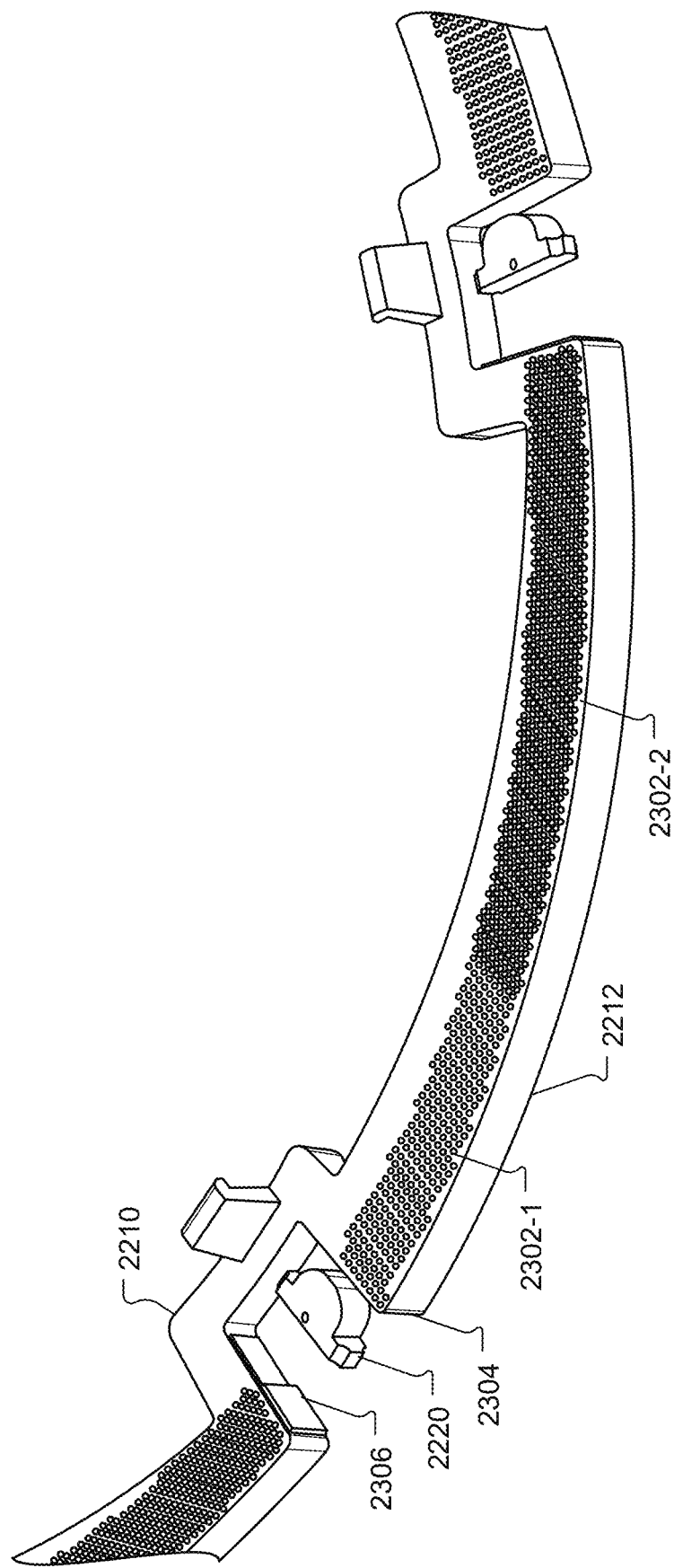
FIG. 23 illustrates a view of the light guide, according to some embodiments.

FIG. 23 illustrates a view of the light guide 2210, according to some embodiments. As described above for the keypad device 1702, the light guide 2210 includes a plurality of cutouts 2304 that are sized to accept the LEDs 2220 on the circuit board 2214. Each of the LEDs 2220 may be associated with a subsequent transmissive section 2212 of the light guide 2210. As described above, each of the transmissive sections of the light guide may have a tapering thickness as the transmissive sections 2212 extend away from their corresponding LEDs 2220. Again, the "thickness" refers to the horizontal thickness of the transmissive section 2212 in the direction parallel to the circuit board 2214. This tapering effect allows more light from the LEDs 2220 to travel down the length of the transmissive sections 2212 such that the light can be uniformly reflected upwards throughout the length of the transmissive section 2212.

Also as described above, the transmissive section 2212 may include a plurality of micro-lenses 2302. The micro-lenses may be arranged such that the relative density of micro-lenses increases as the transmissive section 2212 extends away from the LED 2220. In this embodiment, the relative density of the micro-lenses 2302 increases using at least two different techniques. First, the tapering of the thickness of the transmissive section 2212 serves to increase the density of micro-lenses per unit thickness of the transmissive section 2212. Second, the micro-lenses 2302 are divided into at least two different sections having different densities. A first section of micro-lenses 2302-1 may be more densely spaced than a second section of micro-lenses 2302-2 that is further away from the LED 2220 in the transmissive section 2212. These two sections are shown merely by way of example, and are not meant to be limiting. Other embodiments may use more than two sections of micro-lenses 2302, each having different spacings and densities.

In order to isolate one transmissive section 2212 from other transmissive sections, the end of each transmissive section 2212 may include a reflective/black sticker 2306. The side of the sticker 2306 directed towards the previous transmissive section 2212 may include a black absorptive surface that absorbs any light that would otherwise extend past the end of the transmissive section 2212. Without the sticker 2306, the light from a previous LED 2220 could bleed into the next LED 2220 area, causing the area around each LED to appear brighter in the visible light ring. The other side of the sticker 2306 facing the LED 2220 may be a reflective surface or a black surface, depending on whether the appearance of the light ring above the LED 2220 is too bright or too dark. This decision can be made with each individual embodiment.

Figure 24:
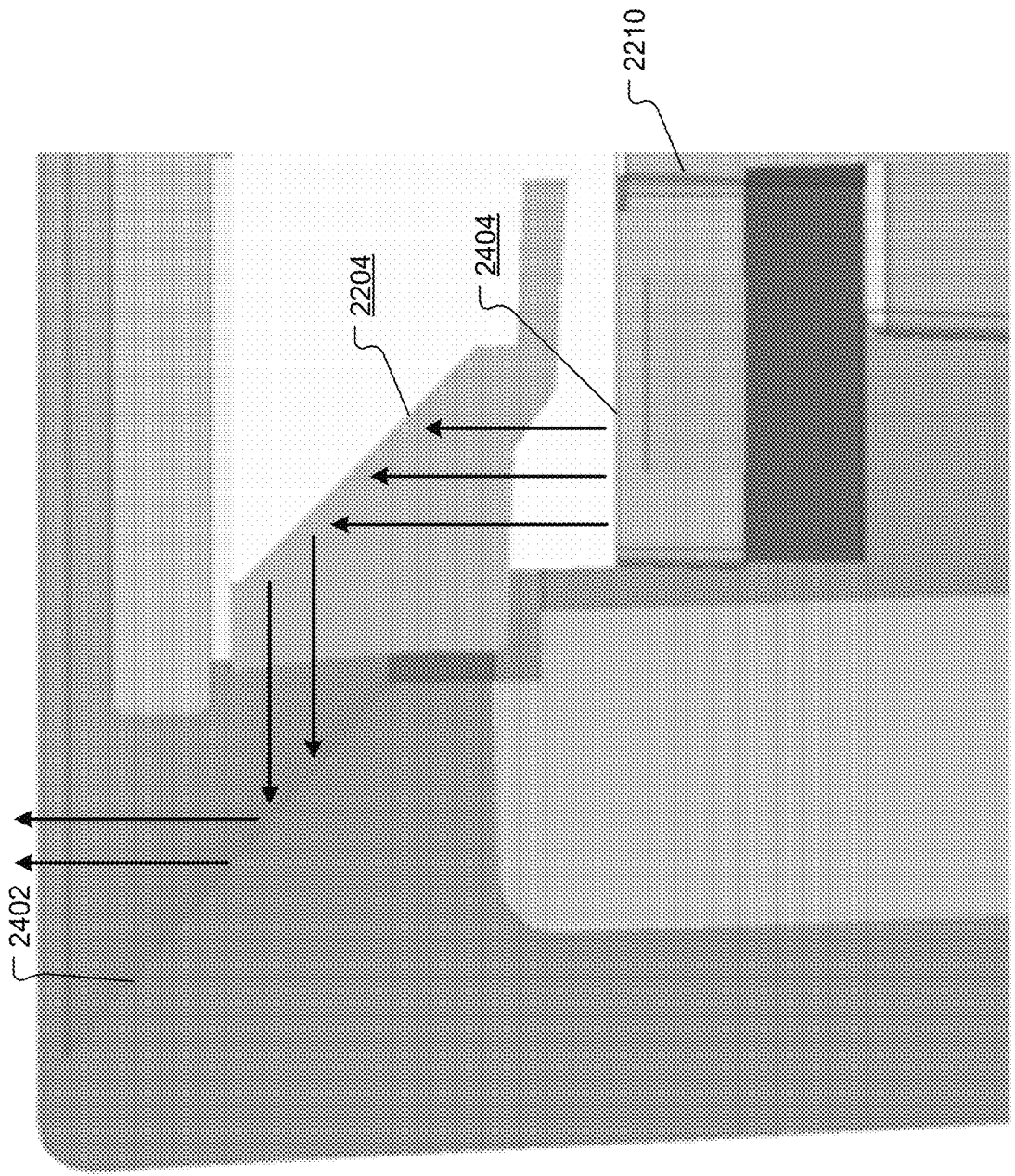
FIG. 24 illustrates a cross-sectional view of the assembled device as light is channeled from the LEDs to outside of the device as a uniform light ring.

FIG. 24 illustrates a cross-sectional view of the assembled device 2102 as light is channeled from the LEDs to outside of the device 2102 as a uniform light ring. As the light is reflected upwards by the micro-lenses described in FIG. 23, the light exits the light guide 2110 through the top surface of the light guide 2110, which may be considered a substantially circular output surface 2404. After exiting the substantially circular output surface 2404, the light passes through the light diffuser 2204 and is reflected horizontally out of the light diffuser towards an angled section of the housing 2402 of the device 2102. Thus, the user may observe a reflected light output around the outside of the cover of the device 2102.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of generating a uniform light ring in a smart-home device, the method comprising:
    generating light from a plurality of light-emitting diodes (LEDs);
    receiving the light from the plurality of LEDs at a light guide, wherein the light guide comprises:
        a plurality of cutouts that receive the plurality of LEDs;
        a plurality of transmissive sections between the plurality of cutouts that are arranged in a ring shape to form the light guide, wherein the plurality of cutouts comprises surfaces that absorbs light emitted from a corresponding previous LED in the plurality of LEDs to optically separate light traveling between sequential transmissive sections in the plurality of transmissive sections; and
        a plurality of micro-lenses in the plurality of transmissive sections, wherein a linear number density of the micro-lenses across a thickness of the transmissive sections increases as the transmissive sections extend away from the plurality of cutouts, and wherein the thickness of the transmissive sections is orthogonal to a direction in which the transmissive sections extend away from the plurality of cutouts;
    channeling light down the plurality of transmissive sections; and
    emitting light from an output surface of the light guide, wherein the output surface is substantially circular.

2. The method of claim 1, wherein the plurality of LEDs are top-firing LEDs.

3. The method of claim 2, wherein the plurality of transmissive sections run parallel to the light emitted from the top-firing LEDs.

4. The method of claim 3, wherein the plurality of transmissive sections have a scalloped shape.

5. The method of claim 1, wherein the plurality of LEDs are side-firing LEDs.

6. The method of claim 5, the plurality of transmissive sections run between each of the plurality of cutouts in a substantially circular shape.

7. The method of claim 1, wherein the smart-home device further comprises a diffusive ring through which light from the output surface is diffused before leaving the smart-home device.

8. The method of claim 1, wherein the smart-home device comprises a video camera.

9. The method of claim 1, wherein the smart-home device comprises a motion sensor of a security system.

10. The method of claim 1, wherein a thickness of the transmissive sections tapers as the transmissive sections extend away from the plurality of cutouts.

11. A light ring assembly for a smart-home device, the light ring assembly comprising:
  a plurality of light-emitting diodes (LEDs);
  a light guide, wherein the light guide comprises:
    a plurality of cutouts that receive the plurality of LEDs;
    a plurality of transmissive sections between the plurality of cutouts that are arranged in a ring shape to form the light guide, wherein the plurality of cutouts comprises surfaces that absorbs light emitted from a corresponding previous LED in the plurality of LEDs to optically separate light traveling between sequential transmissive sections in the plurality of transmissive sections; and
    a plurality of micro-lenses in the plurality of transmissive sections, wherein a linear number density of the micro-lenses across a thickness of the transmissive sections increases as the transmissive sections extend away from the plurality of cutouts, and wherein the thickness of the transmissive sections is orthogonal to a direction in which the transmissive sections extend away from the plurality of cutouts; and
  an output surface that receives light emitted from the plurality of LEDs through the plurality of transmissive sections, wherein the output surface is substantially circular.

12. The light ring assembly of claim 11, further comprising a light mask that is coupled to the light guide.

13. The light ring assembly of claim 12, wherein the light mask comprises a Mylar tape that is adhered to the exterior surface of the light guide.

14. The light ring assembly of claim 12, wherein the light mask is coupled to a portion of the light guide that is at least in part directly above one of the plurality of cutouts.

15. The light ring assembly of claim 12, wherein a width of the light mask tapers as the light mask extends away from one of the plurality of cutouts.

16. The light ring assembly of claim 11, wherein the smart-home device comprises a first reflective surface, wherein light emitted from the output surface of the light ring assembly is reflected off of the first reflective surface before exiting the smart-home device.

17. The light ring assembly of claim 16, wherein the smart-home device comprises a second reflective surface, wherein light reflected off of the first reflective surface is reflected off of the second reflective surface before exiting the smart-home device.

18. The light ring assembly of claim 11, wherein a light output of the output surface is substantially uniform.

19. The light ring assembly of claim 11, wherein the plurality of LEDs consists of two LEDs.

20. The light ring assembly of claim 11, wherein the plurality of cutouts are evenly distributed in a circular pattern around the light guide.

* * * * *